(12) United States Patent
Regnery et al.

(10) Patent No.: US 11,731,877 B2
(45) Date of Patent: Aug. 22, 2023

(54) METHODS AND SYSTEMS FOR PRODUCING AN ENHANCED SURFACE AREA BIOCHAR PRODUCT

(71) Applicant: ARIES CLEAN TECHNOLOGIES LLC, Franklin, TN (US)

(72) Inventors: Joseph Regnery, Castle Pines, CO (US); Joel Thornton, Nashville, TN (US); Matt Newman, Spring Hill, TN (US); Brandon Davis, Murfreesboro, TN (US)

(73) Assignee: ARIES CLEAN TECHNOLOGIES LLC, Franklin, TN (US)

( * ) Notice: Subject to any disclaimer, the term of this patent is extended or adjusted under 35 U.S.C. 154(b) by 0 days.

(21) Appl. No.: 17/862,399

(22) Filed: Jul. 11, 2022

(65) Prior Publication Data
US 2022/0340428 A1 Oct. 27, 2022

Related U.S. Application Data

(63) Continuation of application No. 17/588,194, filed on Jan. 28, 2022, now Pat. No. 11,414,322, which is a
(Continued)

(51) Int. Cl.
*C01B 32/324* (2017.01)
*C01B 32/336* (2017.01)
(Continued)

(52) U.S. Cl.
CPC .......... *C01B 32/324* (2017.08); *C01B 32/336* (2017.08); *C10B 19/00* (2013.01);
(Continued)

(58) Field of Classification Search
CPC ..... C01B 32/324; C01B 32/336; C10B 19/00; C10B 39/06; C10B 47/18; C10B 47/30;
(Continued)

(56) References Cited

U.S. PATENT DOCUMENTS 3,565,827 A * 2/1971 Friday ................... C01B 32/336
502/433
5,173,921 A 12/1992 Gaylord
(Continued)

FOREIGN PATENT DOCUMENTS

WO WO-9309061 A1 * 5/1993 ........... C01B 32/336

*Primary Examiner* — Matthew J Merkling
(74) *Attorney, Agent, or Firm* — Hollowell Patent Group; Kelly Hollowell

(57) ABSTRACT

Herein disclosed are apparatus and associated methods related to producing an enhanced surface area biochar product with a desired activation level based on receiving biochar into a processing vessel configured with multiple independently temperature-controlled chambers and counter-flow steam injection, controlling activation levels of the biochar by moving the biochar through the processing vessel and adjusting the temperature of the biochar by injecting steam into at least one temperature-controlled chamber of the processing vessel, recovering volatiles driven off through dehydration using a thermal oxidizer, cooling the biochar to a desired discharge temperature using steam and retention time, and discharging the activated biochar product. The processing vessel may be a calciner, a rotary calciner, or a kiln. Biochar may be heated or cooled to a desired thermochemical processing temperature depending on the temperature of the received biochar. Counter-flow saturated steam may sweep volatile gases to a thermal oxidizer using a vacuum system.

14 Claims, 11 Drawing Sheets

Related U.S. Application Data continuation-in-part of application No. 17/359,689, filed on Jun. 28, 2021, now Pat. No. 11,268,039, and a continuation-in-part of application No. 17/359,698, filed on Jun. 28, 2021, now Pat. No. 11,268,030, and a continuation-in-part of application No. 17/359,708, filed on Jun. 28, 2021, now Pat. No. 11,268,029, and a continuation-in-part of application No. 17/359,743, filed on Jun. 28, 2021, now Pat. No. 11,268,031.

(60) Provisional application No. 63/240,543, filed on Sep. 3, 2021, provisional application No. 63/153,643, filed on Feb. 25, 2021, provisional application No. 63/153,021, filed on Feb. 24, 2021.

(51) Int. Cl.
| | | |
|---|---|---|
| *C10J 3/84* | (2006.01) | |
| *C10B 47/30* | (2006.01) | |
| *C10B 39/06* | (2006.01) | |
| *C10B 47/18* | (2006.01) | |
| *C10B 57/00* | (2006.01) | |
| *C10B 19/00* | (2006.01) | |

(52) U.S. Cl.
CPC .............. *C10B 39/06* (2013.01); *C10B 47/18* (2013.01); *C10B 47/30* (2013.01); *C10B 57/005* (2013.01); *C10J 3/84* (2013.01); *C10J 2300/0916* (2013.01); *C10J 2300/1625* (2013.01)

(58) Field of Classification Search
CPC ... C10B 57/005; C10J 3/84; C10J 2300/0916; C10J 2300/1625
See application file for complete search history.

(56) References Cited

U.S. PATENT DOCUMENTS

| | | | |
|---|---|---|---|
| 5,547,548 A * | 8/1996 | Siddoway | ............... C10B 39/04 44/620 |
| 5,946,342 A | 8/1999 | Koslow | |
| 8,580,000 B2 | 11/2013 | Sugita | |
| 2003/0179537 A1 | 9/2003 | Tanaka | |
| 2007/0012232 A1 | 1/2007 | Skrypski-Mantele | |
| 2007/0101912 A1 | 5/2007 | Kohchi | |
| 2009/0090057 A1 | 4/2009 | Regnery | |
| 2009/0094141 A1 | 4/2009 | Regnery | |
| 2011/0136971 A1 | 6/2011 | Tucker | |
| 2011/0258914 A1 * | 10/2011 | Banasiak | ................. C10K 1/02 44/605 |
| 2012/0000175 A1 | 1/2012 | Wormser | |
| 2012/0167585 A1 | 7/2012 | Wormser | |
| 2014/0148333 A1 | 5/2014 | Jones | |
| 2015/0175891 A1 | 6/2015 | Kozuru | |
| 2015/0197457 A1 | 7/2015 | Aldridge | |
| 2017/0051221 A1 | 2/2017 | Park | |
| 2018/0280906 A1 | 10/2018 | Weaver | |
| 2019/0337809 A1 * | 11/2019 | Adams | .................. C01B 32/336 |
| 2020/0040268 A1 | 2/2020 | Kelfkens | |
| 2020/0140768 A1 | 5/2020 | Kelfkens | |
| 2020/0190416 A1 | 6/2020 | Kelfkens | |

\* cited by examiner

METHODS AND SYSTEMS FOR PRODUCING AN ENHANCED SURFACE AREA BIOCHAR PRODUCT

CROSS-REFERENCE TO RELATED APPLICATIONS

This application is a Continuation of U.S. application Ser. No. 17/588,194 filed Jan. 28, 2022, which is a Continuation-in-part of U.S. application Ser. Nos. 17/359,689; 17/359,698; 17/359,708; and Ser. No. 17/359,743; all four of which were filed on Jun. 28, 2021. In addition, this application claims priority to Provisional Application No. 63/240,543 filed Sep. 3, 2021; Provisional Application No. 63/153,643 filed Feb. 25, 2021; and Provisional Application No. 63/153,021 filed Feb. 24, 2021. The contents of which are incorporated herein by reference.

TECHNICAL FIELD

This disclosure relates generally to activating and cooling biochar, and more particularly, to the production of a controlled activation level enhanced surface area biochar product based on adjusting biochar temperature, cooling biochar with injected steam, and recovering volatiles driven off through dehydration.

BACKGROUND

Decarbonization of the energy sector is a topic of importance to avoid irreversible global warming. Hydrogen has been considered as an option to replace fossil fuels in industrial, residential, and transport applications. However, hydrogen production has been almost limited to the reforming of hydrocarbons. Reforming hydrocarbons may release large amounts of $CO_2$, thus requiring several downstream purification processes.

Gasification is a thermal decomposition process in which solid organic or carbonaceous materials (feedstock) may break down into a combustible gas mixture. The combustible gas components formed are primarily carbon monoxide (CO), hydrogen ($H_2$), and methane ($CH_4$). Other non-combustible gases such as nitrogen ($N_2$), steam ($H_2O$), and carbon dioxide ($CO_2$) may also be present in various quantities. The process of gasification may involve pyrolysis followed by partial oxidation, which may be controlled by injecting air or other oxygen containing gases into the partially pyrolyzed feedstock. More specifically, biomass gasification may be a sequence of reactions including water evaporation, lignin decomposition, cellulosic deflagration and carbon reduction. An external heat source may begin the reaction, but partial oxidation may provide heat to maintain the thermal decomposition of the feedstock. If concentrated oxygen is used, the resulting gas mixture may be called syngas. If air (which includes nitrogen) is used as the oxidant, the resulting gas mixture may be called producer gas. For simplicity, the term "Producer Gas" as used herein shall include both syngas and producer gas. Both gas mixtures are considered a "fuel gas" and can be used as a replacement for natural gas in some processes. They can also be used as a precursor to generate various industrial chemicals and motor fuels. When biomass is used as the feedstock, gasification and combustion of the Producer Gas is considered to be a source of renewable energy.

As a general matter, gasification offers a more efficient, cost effective and environmentally friendly alternative for extracting potential energy from solid feedstock as compared to combustion. As a result of gasification, the feedstock's potential energy can be converted to Producer Gas, which is cleaner burning, compressible and more portable. Producer Gas may be burned directly in some engines and burners, purified to produce methanol and hydrogen, or converted via the Fischer-Tropsch and other methods and processes into synthetic liquid fuel.

In general, biomass gasification is the thermochemical conversion of organic (waste) feedstock in a high-temperature environment, through which biomass may be converted not only to syngas for energy generation but also to chemicals, for instance, methane, ethylene, adhesives, fatty acids, surfactants, detergents, and plasticizers. A byproduct of biomass gasification is hot biochar.

In various aspects the present disclosure relates to direct cooling of biochar resulting from gasification by downdraft and fluidized bed gasifiers. Brief downdraft and fluidized bed gasification descriptions and simple examples of downdraft and fluidized bed gasifiers are provided. Exemplary downdraft gasification may be implemented using downdraft gasification techniques disclosed with reference to FIGS. 1-21 of U.S. Pat. No. 10,662,386 by Kelfkens, et al., filed on Dec. 6, 2019 as U.S. patent application Ser. No. 16/705,837, and entitled "Method for gasifying feedstock with high yield production of biochar," the entire contents of which are herein incorporated by reference. Exemplary fluidized bed gasification may be implemented using fluidized bed gasification techniques disclosed with reference to FIGS. 1-8 of U.S. Pat. No. 10,696,913 by Kelfkens, et al., filed on Dec. 20, 2019 as U.S. patent application Ser. No. 16/723,538, and entitled "Gasification reactor with pipe distributor," the entire contents of which are herein incorporated by reference.

Downdraft Gasification

In downdraft gasification, all feedstock, air and gases flow in the same direction—from top to bottom. Although updraft gasification is typically favored for processing of biomass feedstock and fluid bed gasification is typically used in gasification of coal, downdraft gasification process has a number of advantages. One advantage of downdraft gasification is low levels of tar in the resulting Producer Gas because the tars generated during pyrolysis must pass through the Oxidation Zone and the char bed in the Reduction Zone before exiting the gasifier. The high temperature of the Oxidation Zone and the top of the char bed breaks down the tars (i.e., thermal cracking). The result is a Producer Gas that may be cooled and more easily cleaned for use in reciprocating engines, gas-fired turbines and catalytic reforming processes.

In an exemplary downdraft gasifier implementation, there may be three zones: a Pyrolysis Zone, an Oxidation Zone and a Reduction Zone. In such a gasifier, (1) the residence time of feedstock could be controlled in the Oxidation Zone (relative to the flow of feedstock through the rest of the gasifier) to allow the maximum amount of feedstock to undergo gasification before passing out of the Oxidation Zone into the Reduction Zone and (2) the Reduction Zone would be designed to cause the hot gas produced in the Oxidation Zone to mix with the char in the Reduction Zone as quickly and as thoroughly as possible to promote thorough gasification.

Fluidized-Bed Gasification

In an exemplary fluidized-bed gasifier implementation, oxidant may be blown through a bed of solid particles at a sufficient velocity to keep the solid particles in a state of suspension. The feedstock is introduced to the gasifier, very quickly mixed with the bed material and almost instantaneously heated to the bed temperature either externally or using a heat transfer medium. Most of these fluidized-bed gasifiers are equipped with an internal cyclone in order to minimize char (carried over into the Producer Gas stream) and remove fluidizing media from the Producer Gas. The major advantages include feedstock flexibility and the ability to easily control the reaction temperature, which allows for gasification of fine grained materials (sawdust, etc.) without the need of pre-processing. Fluidized-bed gasifiers also scale very well to large sizes.

In various exemplary gasification scenarios, hot carbonaceous residue may come off or through the grate of a downdraft gasifier, off the bottom of a cyclone, or off the bottom of a cyclone in association with a fluidized bed gasifier. Both downdraft and fluidized bed gasifier systems may employ an expensive indirect cooling approach to create a cool biochar that may not be resizable (Grinder) based on product demand by a gasifier system using indirect cooling.

Some prior art biochar cooling implementations may indirectly utilize heated steam to run over biochar to improve the biochar's compositional characteristics. These prior art biochar cooling processes may heat steam to extremely high temperatures to react with ambient temperature biochar. Some prior art biochar cooling implementations may indirectly utilize heated hydrocarbon gas run over biochar to improve compositional characteristics and decompose methane. These prior art biochar cooling processes may heat hydrocarbon gas streams to extremely high temperatures to react with the ambient temperature biochar.

In an illustrative example, the composition of biochar product from a gasifier employing indirect cooling may not be useful in high value applications, such as, for example, as an alternative to activated carbon. In addition, the biochar product from a gasifier employing indirect cooling may not be useful in production of high purity carbon for manufacturing purposes, such as, for example, graphene.

SUMMARY

Herein disclosed are apparatus and associated methods related to producing an enhanced surface area biochar product with a desired activation level based on receiving biochar into a processing vessel configured with multiple independently temperature-controlled chambers and counter-flow steam injection, controlling activation levels of the biochar by moving the biochar through the processing vessel and adjusting the temperature of the biochar by injecting steam into at least one temperature-controlled chamber of the processing vessel, recovering volatiles driven off through dehydration using a thermal oxidizer, cooling the biochar to a desired discharge temperature using steam and retention time, and discharging the activated biochar product. The processing vessel may be a calciner, a rotary calciner, or a kiln. Biochar may be heated or cooled to a desired thermochemical processing temperature depending on the temperature of the received biochar. Counter-flow saturated steam may sweep volatile gases to a thermal oxidizer using a vacuum system.

An exemplary biochar activation and cooling implementation for producing a controlled activation level enhanced surface area biochar product may comprise adjusting biochar temperature, cooling biochar with injected steam, and recovering volatiles driven off through dehydration. An exemplary biochar activation and cooling implementation may comprise a processing vessel configured with multiple independently temperature-controlled chambers or sections that are used for control of temperature during production of the activated and cooled biochar product. An exemplary biochar activation and cooling implementation may comprise calcination of the product. The processing vessel may be, for example, a calciner, a rotary calciner, or a kiln. Some implementations may be configured to use steam to enhance and control activation levels of the carbon in the biochar, by injecting steam into the processing vessel. The biochar may be received from a downdraft gasifier. In an illustrative example, an exemplary implementation may be generally referred to as integrated calcination and cooling of biochar produced in a down draft gasifier.

An exemplary biochar activation and cooling implementation for producing a controlled activation level enhanced surface area biochar product may comprise capability to control (increase or decrease) the temperature of carbonaceous material (biochar) as the biochar moves through a processing vessel such as, for example, a rotary calciner. Some implementations may be configured with a control system configured to measure and control (increase or decrease) the temperature of the carbonaceous material (biochar) as the biochar moves through the processing vessel. An exemplary biochar activation and cooling processing vessel implementation may be configured with multiple distinct independently temperature-controllable processing zones. In one implementation, the biochar activation and cooling processing vessel is configured with three distinct operating zones (heating, steam injection/activation, final cooling), of which each section may be separated by concentric cylinders or other separating means depending on the appropriate processing vessel design.

An exemplary biochar activation and cooling implementation for producing a controlled activation level enhanced surface area biochar product may comprise using multiple independently temperature-controllable processing vessel sections or chambers to process the biochar in sequence from section to section as the biochar is moved through the processing vessel. In an illustrative example, the biochar or other carbonaceous material may be moved through the processing vessel by a rotating inner cylinder passing through the multiple independently temperature-controllable processing vessel sections or chambers. In an exemplary implementation, the first section of the processing vessel is the heating section. The carbonaceous material may be received into the processing vessel heating section from one or more gasifier. When the carbonaceous material enters the processing vessel colder than a predetermined activation temperature, an exemplary biochar activation and cooling implementation may heat the biochar indirectly in the heating section using electrical heating or other heating means to insure proper reactivity of the carbonaceous material. In an illustrative example, a biochar activation and cooling implementation in accordance with the teaching of the present disclosure may heat the biochar in the heating section using hot exhaust from a gas heater or recovered process heat. In some biochar activation and cooling implementations, hot air from waste heat may be recovered using a waste gas power generator.

In an exemplary implementation, after passing through the heating section, the carbonaceous material is received into the next section of the processing vessel. In some implementations, the heating section is followed by, in sequence, a steam injection/activation chamber and a cooling section. In another implementation, the heating section is followed by the cooling section. In an illustrative example, when the carbonaceous material enters the next section after the heating section, steam is injected directly onto the carbonaceous material. The steam may be injected using a steam lance or injection port. In an illustrative example, the injected steam will react and cool the carbonaceous material as the steam injection moves in a counter flow direction to an off-gas outlet nearer the front of the processing vessel, where the gas may be extracted as an off-gas. The extracted off-gas may be sent to a thermal oxidizer using a vacuum pump/fan.

In an exemplary biochar activation and cooling implementation the cooling section is the final section. In some implementations, the cooling section may be the third section, after a steam injection/activation section following the heating section. In some implementations, the cooling section may be the second and final section. In an illustrative example, water or cool air may be used to indirectly cool carbonaceous material in the cooling section. An implementation in accordance with the teaching of the present disclosure may be configured to cause cooling air/water flow to move in a co-current of counter flow direction to the biochar outlet of the processing vessel. In an illustrative example, the activated carbonaceous material may be moved by flights in one rendition through a rotating inner cylinder that passes the carbonaceous material through the section(s) exiting the processing vessel. The processing vessel may be calciner. The calciner may be a rotary calciner. The processing vessel may be a kiln. The processing vessel may be a rotary kiln. An implementation in accordance with the teaching of the present disclosure may be designed with a screw auger configured in the inner cylinder of a processing vessel (such as, for example, a calciner) to move the carbonaceous material through the processing vessel. In an exemplary biochar activation and cooling implementation for producing a controlled activation level enhanced surface area biochar product, reactions occurring within the processing vessel may comprise evaporation, dehydration, and organic compound decomposition.

Exemplary apparatus and method aspects may relate to cooling hot biochar based on applying cool gas directly to the hot biochar. The gas may be steam comprising water vapor. Biochar may be cooled in a cooling chamber by cool steam injected into a steam loop configured to cool the steam. The biochar cooled with steam may be dried in a drying chamber by dry gas injected from a gas loop. The gas may be hydrocarbon gas. Biochar may be heated in a processing chamber. Heated biochar may be cooled in a cooling chamber by cool hydrocarbon gas injected to the cooling chamber. Biochar in the processing chamber may be heated with heat recovered from cooling. Filtered byproducts and tail gas may be recovered from the cooling chamber. Tail gas may be recycled. Various direct biochar cooling implementations may produce biochar having enhanced carbon content, increased surface area, and a hydrogen stream byproduct.

In an aspect, an apparatus may comprise: a cooling chamber; a steam loop configured to be fluidly coupled with the cooling chamber; a drying chamber configured to be fluidly coupled with the cooling chamber; a gas loop configured to be fluidly coupled with the drying chamber; and a control system configured to cause the apparatus to perform operations comprising: inject cool steam from the steam loop into the cooling chamber; apply the cool steam directly to hot biochar retained within the cooling chamber; and in response to a determination the biochar retained within the cooling chamber cooled to a predetermined temperature: discharge the cooled biochar into the drying chamber; inject dry gas from the gas loop into the drying chamber; and in response to a determination the biochar retained within the drying chamber dried to a predetermined moisture level, discharge the cooled dried biochar from the drying chamber.

The apparatus may further comprise the cooling chamber configured to receive hot biochar via at least one discharge valve configured to be fluidly coupled with the cooling chamber.

The operations performed by the apparatus may further comprise receive hot biochar into the cooling chamber via at least one discharge valve fluidly coupled with the cooling chamber.

Receive hot biochar may further comprise receive hot biochar from a gasifier fluidly coupled with the apparatus.

The gasifier may further comprise a downdraft gasifier.

The gasifier may further comprise a fluidized bed gasifier.

The steam loop may further comprise a heat exchanger.

The gas loop may further comprise a particulate filter.

The apparatus may further comprise at least one discharge valve configured to fluidly couple the cooling chamber to the drying chamber.

In an implementation, an apparatus may comprise: a cooling chamber; at least one discharge valve configured to be fluidly coupled with the cooling chamber, wherein the at least one discharge valve is configured to be fluidly coupled with a gasifier to direct hot biochar from the gasifier into the cooling chamber; a steam loop configured to be fluidly coupled with the cooling chamber, wherein the steam loop is configured with a steam particulate filter and a heat exchanger; a drying chamber configured to be fluidly coupled with the cooling chamber by at least one discharge valve configured to direct biochar from the cooling chamber into the drying chamber; a gas loop configured to be fluidly coupled with the drying chamber, wherein the gas loop is configured with a gas particulate filter and a heat exchanger; at least one discharge valve configured to be fluidly coupled with the drying chamber, wherein the at least one discharge valve is configured to release biochar from the drying chamber; and a control system configured to cause the apparatus to perform operations comprising: receive hot biochar from the gasifier into the cooling chamber; inject cool steam from the steam loop into the cooling chamber; apply the cool steam directly to the hot biochar retained within the cooling chamber; and in response to a determination the biochar retained within the cooling chamber cooled to a predetermined temperature: discharge the cooled biochar into the drying chamber; inject dry gas from the gas loop into the drying chamber; and in response to a determination the biochar retained within the drying chamber dried to a predetermined moisture level, release the cooled dried biochar from the drying chamber.

The gasifier may further comprise a downdraft gasifier.

The gasifier may further comprise a fluidized bed gasifier.

The cooling chamber may be fluidly coupled with the gasifier.

The steam particulate filter may further comprise a ceramic filter.

The gas particulate filter may further comprise a sintered metal filter.

The apparatus may further comprise stainless steel.

In an implementation, an apparatus may comprise: a cooling chamber configured with a gas inlet, a biochar inlet, a biochar outlet, and a gas outlet; at least one discharge valve configured to be fluidly coupled with the cooling chamber biochar inlet, wherein the at least one discharge valve is configured to be fluidly coupled with a gasifier to direct hot biochar from the gasifier into the cooling chamber; a steam loop configured to be fluidly coupled with the cooling chamber gas inlet and the cooling chamber gas outlet, wherein the steam loop comprises a steam makeup port fluidly coupled with the steam loop; a steam particulate filter configured with an inlet and a filtered outlet, wherein the steam particulate filter inlet is fluidly coupled with the cooling chamber gas outlet, and wherein the steam particulate filter outlet is fluidly coupled with the steam loop; a heat exchanger configured in the steam loop, wherein the heat exchanger comprises a steam to liquid heat exchanger; a drying chamber configured with a gas inlet, a biochar inlet, a biochar outlet, and a gas outlet, wherein the drying chamber biochar inlet is configured to be fluidly coupled with the cooling chamber biochar outlet by at least one discharge valve configured to direct biochar from the cooling chamber into the drying chamber; a gas loop configured to be fluidly coupled with the drying chamber gas inlet and the drying chamber gas outlet, wherein the gas loop comprises a gas makeup port fluidly coupled with the gas loop; a gas particulate filter configured with an inlet and a filtered outlet, wherein the gas particulate filter inlet is fluidly coupled with the drying chamber gas outlet, and wherein the gas particulate filter outlet is fluidly coupled with the gas loop; a heat exchanger configured in the gas loop, wherein the heat exchanger comprises a gas to liquid or gas to gas heat exchanger; and a control system configured to cause the apparatus to perform operations comprising: receive hot biochar from the gasifier into the cooling chamber; inject cool steam from the steam loop into the cooling chamber gas inlet; apply the cool steam directly to hot biochar retained within the cooling chamber; and in response to a determination the biochar retained within the cooling chamber cooled to a predetermined temperature: discharge the cooled biochar into the drying chamber; inject dry gas from the gas loop into the drying chamber; and in response to a determination the biochar retained within the drying chamber dried to a predetermined moisture level, release the cooled dried biochar from the drying chamber.

The apparatus may further comprise a biochar recovery system fluidly coupled with the drying chamber biochar outlet, and wherein release the cooled dried biochar from the drying chamber further comprises release the cooled dried biochar into the biochar recovery system.

The operations performed by the apparatus may further comprise inject cool steam into the steam loop steam makeup port.

The operations performed by the apparatus may further comprise inject dry gas into the gas loop gas makeup port.

In another aspect, an apparatus may comprise: a processing chamber; a heat source thermally coupled with the processing chamber; a cooling chamber configured to be fluidly coupled with the processing chamber; and a control system configured to cause the apparatus to perform operations comprising: heat biochar retained within the processing chamber; and in response to a determination the biochar retained within the processing chamber heated to a predetermined temperature: discharge the hot biochar into the cooling chamber; inject cool gas into the cooling chamber; apply the cool gas directly to the hot biochar retained within the cooling chamber; and in response to a determination the biochar retained within the cooling chamber cooled to a predetermined temperature, discharge the cooled biochar from the cooling chamber.

The processing chamber may be configured to receive biochar via at least one discharge valve configured to be fluidly coupled with the processing chamber.

The operations performed by the apparatus may further comprise receive biochar into the processing chamber via at least one discharge valve fluidly coupled with the processing chamber.

Receive biochar may further comprise receive biochar from a gasifier fluidly coupled with the apparatus.

The gasifier may further comprise a downdraft gasifier.

The gasifier may further comprise a fluidized bed gasifier.

The heat source may further comprise a heating element.

The heat source may further comprise process heat.

The apparatus may further comprise at least one discharge valve configured to fluidly couple the processing chamber to the cooling chamber.

In an implementation, an apparatus may comprise: a processing chamber; at least one discharge valve configured to be fluidly coupled with the processing chamber, wherein the at least one discharge valve is configured to be fluidly coupled with a gasifier to direct biochar from the gasifier into the processing chamber; a heat source thermally coupled with the processing chamber, wherein the heat source comprises a heating element; a cooling chamber configured to be fluidly coupled with the processing chamber by at least one discharge valve configured to direct biochar from the processing chamber into the cooling chamber, wherein the cooling chamber includes a gas inlet port, and wherein the cooling chamber includes a gas outlet configured to be fluidly coupled with a particulate filter by a discharge valve; a $CO_2$ removal filter having an inlet, a $CO_2$ outlet, and a mixed gas outlet, wherein the $CO_2$ removal filter inlet is fluidly coupled with the particulate filter; an $H_2$ removal filter having an inlet, an $H_2$ outlet, and a mixed gas outlet, wherein the $H_2$ removal filter inlet is fluidly coupled with the $CO_2$ removal filter mixed gas outlet; at least one discharge valve configured to be fluidly coupled with the cooling chamber, wherein the at least one discharge valve is configured to release biochar from the cooling chamber; and a control system configured to cause the apparatus to perform operations comprising: heat biochar retained within the processing chamber, using the heat source; and in response to a determination the biochar retained within the processing chamber heated to a predetermined temperature: discharge the hot biochar into the cooling chamber; inject cool gas comprising hydrocarbon into the cooling chamber through the cooling chamber gas inlet port; apply the cool hydrocarbon gas directly to the hot biochar retained within the cooling chamber; and in response to a determination the biochar retained within the cooling chamber cooled to a predetermined temperature: release the cooled biochar from the cooling chamber; and release the hydrocarbon gas into the particulate filter through the cooling chamber gas outlet.

The gasifier may further comprise a downdraft gasifier.

The gasifier may further comprise a fluidized bed gasifier.

The processing chamber may be fluidly coupled with the gasifier.

The apparatus may further comprise a thermal oxidizer thermally coupled with the processing chamber, and a tail gas recycle loop fluidly coupled with the $H_2$ removal filter mixed gas output and the thermal oxidizer.

The tail gas recycle loop may be fluidly coupled with the cooling chamber gas inlet port.

The apparatus may further comprise a biochar recovery system and the operations performed by the apparatus further comprise release the cooled biochar into the biochar recovery system.

In an implementation, an apparatus may comprise: a processing chamber; at least one discharge valve configured to be fluidly coupled with the processing chamber, wherein the at least one discharge valve is fluidly coupled with a gasifier to direct biochar from the gasifier into the processing chamber; a cooling chamber configured to be fluidly coupled with the processing chamber by at least one discharge valve configured to direct biochar from the processing chamber into the cooling chamber, wherein the cooling chamber includes a gas inlet port, and wherein the cooling chamber includes a gas outlet configured to be fluidly coupled with a particulate filter by a discharge valve; a $CO_2$ removal filter having an inlet, a $CO_2$ outlet, and a mixed gas outlet, wherein the $CO_2$ removal filter inlet is fluidly coupled with the particulate filter; an $H_2$ removal filter having an inlet, an $H_2$ outlet, and a mixed gas outlet, wherein the $H_2$ removal filter inlet is fluidly coupled with the $CO_2$ removal filter mixed gas outlet; a thermal oxidizer thermally coupled with the processing chamber, and a tail gas recycle loop fluidly coupled with the $H_2$ removal filter mixed gas output and the thermal oxidizer, wherein the tail gas recycle loop is fluidly coupled with the cooling chamber gas inlet port; a heat source thermally coupled with the processing chamber, wherein the heat source comprises heat from the thermal oxidizer; at least one discharge valve configured to be fluidly coupled with the cooling chamber, wherein the at least one discharge valve is configured to release biochar from the cooling chamber; and a control system configured to cause the apparatus to perform operations comprising: heat biochar retained within the processing chamber, using the heat source; and in response to a determination the biochar retained within the processing chamber heated to a predetermined temperature: discharge the hot biochar into the cooling chamber; inject cool gas comprising hydrocarbon into the cooling chamber through the cooling chamber gas inlet port; apply the cool hydrocarbon gas directly to the hot biochar retained within the cooling chamber; in response to a determination the biochar retained within the cooling chamber cooled to a predetermined temperature: release the cooled biochar from the cooling chamber; and release the hydrocarbon gas through the cooling chamber gas outlet into the particulate filter.

The apparatus may further comprise a biochar recovery system and the operations performed by the apparatus further comprise release the cooled biochar into the biochar recovery system.

The apparatus may further comprise a tail gas recovery system fluidly coupled with the $H_2$ removal filter mixed gas outlet.

The apparatus may further comprise an $H_2$ gas recovery system fluidly coupled with the $H_2$ removal filter $H_2$ outlet.

In an aspect, a method may comprise: injecting cool steam into a cooling chamber; applying the cool steam directly to hot biochar retained within the cooling chamber; and in response to a determining the biochar retained within the cooling chamber cooled to a predetermined temperature: discharging the cooled biochar into a drying chamber; injecting dry gas into the drying chamber; and in response to determining the biochar retained within the drying chamber dried to a predetermined moisture level, discharging the cooled dried biochar from the drying chamber.

Injecting cool steam may further comprise injecting steam from a steam loop configured to cool steam.

The steam loop may further comprise a heat exchanger.

The method may further comprise receiving hot biochar into the cooling chamber.

Receiving hot biochar may further comprise receiving hot biochar from a gasifier.

The gasifier may further comprise a downdraft gasifier.

The gasifier may further comprise a fluidized bed gasifier.

Injecting dry gas may further comprise injecting gas from a gas loop configured to dry gas.

The gas loop may further comprise a particulate filter and a heat exchanger.

In an implementation, a method may comprise: receiving hot biochar from a gasifier into a cooling chamber; injecting cool steam from a steam loop into the cooling chamber, wherein the steam loop is configured with a steam particulate filter and a heat exchanger comprising a heat sink; applying the cool steam directly to the hot biochar retained within the cooling chamber; and in response to determining the biochar retained within the cooling chamber cooled to a predetermined temperature: discharging the cooled biochar into a drying chamber; injecting dry gas from a gas loop into the drying chamber, wherein the gas loop is configured with a gas particulate filter and a heat exchanger comprising a heat sink; and in response to determining the biochar retained within the drying chamber dried to a predetermined moisture level, releasing the cooled dried biochar from the drying chamber.

The gasifier may further comprise a downdraft gasifier.

The gasifier may further comprise a fluidized bed gasifier.

The steam particulate filter may further comprise a ceramic filter.

The steam particulate filter may further comprise a sintered metal filter.

The gas particulate filter may further comprise a ceramic filter.

The gas particulate filter may further comprise a sintered metal filter.

In an implementation, a method may comprise: receiving hot biochar from a gasifier into a cooling chamber through a discharge valve; injecting cool steam from a steam loop into the cooling chamber; applying the cool steam directly to hot biochar retained within the cooling chamber; and in response to determining, by a control system, the biochar retained within the cooling chamber cooled to a predetermined temperature: discharging, by the control system, the cooled biochar through a discharge valve into a drying chamber; injecting dry gas from a gas loop into the drying chamber; and in response to determining, by the control system, the biochar retained within the drying chamber dried to a predetermined moisture level, releasing, by the control system, the cooled dried biochar from the drying chamber through a discharge valve.

Releasing the cooled dried biochar from the drying chamber may further comprise releasing the cooled dried biochar into a biochar recovery system.

The method may further comprise injecting cool steam into a steam makeup port fluidly coupled with the steam loop.

The method may further comprise injecting dry gas into a gas makeup port fluidly coupled with the gas loop.

In another aspect, a method may comprise: heating biochar retained within a processing chamber, using a heat source thermally coupled with the processing chamber; and in response to determining the biochar retained within the processing chamber heated to at least a predetermined temperature: discharging the heated biochar into a cooling chamber; injecting cool gas into the cooling chamber; applying the cool gas directly to the biochar retained within the cooling chamber; and in response to determining the biochar retained within the cooling chamber cooled to a predetermined temperature, discharging the cooled biochar from the cooling chamber.

The method may further comprise receiving biochar into the processing chamber.

The method may further comprise receiving biochar from a gasifier into the processing chamber, and retaining the biochar within the processing chamber.

The gasifier may further comprise a downdraft gasifier.

The gasifier may further comprise a fluidized bed gasifier.

The heat source may further comprise a heating element.

The heat source may further comprise process heat, and the method may further comprise: in response to determining the process heat is at least a predetermined minimum temperature, deactivating the heating element.

Discharging the heated biochar into the cooling chamber may further comprise fluidly coupling the processing chamber to the cooling chamber.

The method may further comprise retaining the biochar within the processing chamber for at least a predetermined time period.

In an implementation, a method may comprise: receiving biochar into a processing chamber configured to be fluidly coupled with a gasifier; heating the biochar retained within the processing chamber, using a heat source thermally coupled with the processing chamber, wherein the heat source comprises a heating element and process heat; and in response to determining the biochar retained within the processing chamber heated to a predetermined temperature: discharging the heated biochar into a cooling chamber; injecting cool gas comprising hydrocarbon into the cooling chamber; applying the cool gas comprising hydrocarbon directly to the biochar retained within the cooling chamber; and in response to determining the biochar retained within the cooling chamber cooled to a predetermined temperature: releasing the cooled biochar from the cooling chamber; and releasing gas from the cooling chamber into a particulate filter fluidly coupled with the cooling chamber.

The gasifier may further comprise a downdraft gasifier.

The gasifier may further comprise a fluidized bed gasifier.

The gasifier may be fluidly coupled with the processing chamber.

The method may further comprise recovering carbon dioxide from a $CO_2$ removal filter fluidly coupled with the particulate filter.

The method may further comprise recovering hydrogen from an $H_2$ removal filter fluidly coupled with the particulate filter.

The method may further comprise recycling tail gas as cooling gas supplied to the cooling chamber through a tail gas recycle loop fluidly coupled with the $H_2$ removal filter and the cooling chamber.

The method may further comprise heating the biochar retained within the processing chamber using process heat comprising heat generated by a thermal oxidizer from tail gas, wherein the thermal oxidizer is thermally coupled with the processing chamber.

The method may further comprise supplying the tail gas to the thermal oxidizer from an $H_2$ removal filter fluidly coupled with the particulate filter.

In an aspect, a method may comprise: receiving biochar from a gasifier into a processing chamber; heating biochar retained within the processing chamber, using a heat source thermally coupled with the processing chamber, wherein the heat source comprises a heating element and recovered process heat from a thermal oxidizer supplied with tail gas; in response to a determination, by a control system, the process heat is at least a predetermined minimum temperature, deactivating, by the control system, the heating element; and in response to determining, by a control system, the biochar retained within the processing chamber heated to at least a predetermined minimum temperature: discharging the biochar into a cooling chamber; injecting cool gas into the cooling chamber; applying the cool gas directly to the biochar retained within the cooling chamber; and in response to a determining, by the control system, the biochar retained within the cooling chamber cooled to at least a predetermined maximum temperature: releasing the biochar from the cooling chamber; releasing gas from the cooling chamber into a particulate filter; recovering carbon dioxide from a $CO_2$ removal filter fluidly coupled with the particulate filter; recovering hydrogen from an $H_2$ removal filter fluidly coupled with the $CO_2$ removal filter; supplying tail gas recovered from the $H_2$ removal filter to the thermal oxidizer; heating the processing chamber using process heat comprising heat generated by the thermal oxidizer from the tail gas; and recycling a portion of the tail gas as cooling gas supplied to the cooling chamber.

The method may further comprise repeating the method with the heating element deactivated.

The method may further comprise releasing the biochar from the cooling chamber into a biochar recovery system.

Receiving biochar from the gasifier may further comprise receiving biochar from a plurality of gasifiers.

More than one gasifier of the plurality of gasifiers may be fluidly coupled with the processing chamber.

A direct biochar cooling implementation in accordance with the present disclosure may provide an alternative to an indirect biochar cooling design.

Various implementations in accordance with the present disclosure relate to a cost-effective means to cool hot biochar using direct application of cool gases comprising $H_2O$ or $CH_4$. An exemplary direct cooling implementation in accordance with the present disclosure may decompose cooling gas comprising methane.

A co-effect of an exemplary direct cooling approach in accordance with the present disclosure may be that the cool gases comprising compounds which include $CH_4$ decompose into carbon, which may aggregate as additional solid carbon. Another co-effect may be that the physical and chemical composition of the biochar may be modified as a result of the application of the cooling gas, which may increase the surface area of the carbon and/or modify the carbon structures.

In one aspect of the present disclosure, direct cooling of hot biochar with steam as the hot biochar exits a gasifier or cyclone may create an economical way to cool biochar while enhancing the surface area of the biochar, resulting in a byproduct that is comparable to activated carbon.

In another aspect of the present disclosure, direct cooling of hot biochar with hydrocarbon gas as the hot biochar exits the gasifier or cyclone may create an economical way to cool biochar while enhancing the high-quality carbon content of the biochar with nano tube type carbon formation on the biochar [chemical vapor deposition], while producing a gas stream that may be filtered for high value chemical (such as, for example, hydrogen) recovery.

In an illustrative example, various implementations in accordance with the present disclosure may not use a formulated metal catalyst. To the extent metals are present in biochar produced by such implementations that do not use a formulated metal catalyst, the metals present in the biochar may derive from the natural presence of the metals in the biomass, or the metals' non-deliberate presence in the biosolids.

In various aspects the present disclosure teaches direct biochar cooling.

Direct biochar cooling may be implemented as an apparatus. Direct biochar cooling may be implemented as a method.

The apparatus may comprise steam direct biochar cooling. The apparatus may comprise hydrocarbon gas direct biochar cooling. The apparatus may comprise hydrocarbon gas direct biochar cooling with tail gas recycling.

The steam direct biochar cooling apparatus comprises a cooling chamber. The steam direct biochar cooling apparatus comprises a drying chamber configured to be fluidly coupled with the cooling chamber. The cooling chamber comprises at least one inlet. The cooling chamber comprises at least one outlet. The drying chamber comprises at least one inlet. The drying chamber comprises at least one outlet. The apparatus may comprise a discharge valve configured to fluidly couple the cooling chamber with the drying chamber. The apparatus may comprise a flange configured to be fluidly coupled with the cooling chamber. The cooling chamber may be fluidly coupled with the flange by a discharge valve. The flange fluidly coupled with the cooling chamber may be configured to be fluidly coupled with a gasifier. The flange configured to be fluidly coupled with the gasifier may be fluidly coupled with the cooling chamber by a discharge valve. The apparatus may comprise at least one feed mechanism configured to be fluidly coupled with at least one discharge valve. The at least one feed mechanism may be configured to be fluidly coupled with the cooling chamber. The at least one feed mechanism may be configured to be fluidly coupled with the drying chamber. The apparatus comprises a steam loop fluidly coupled with the cooling chamber. The steam loop may be fluidly coupled with at least one cooling chamber outlet. The steam loop may be fluidly coupled with at least one cooling chamber inlet. The steam loop may comprise a particulate filter serially coupled with at least one cooling chamber outlet and at least one cooling chamber inlet. The steam loop may comprise a heat exchanger serially coupled with at least one cooling chamber outlet and at least one cooling chamber inlet. The heat exchanger may comprise a heat sink. The steam loop may comprise a steam inlet port. The apparatus comprises a gas loop fluidly coupled with the drying chamber. The gas loop may be fluidly coupled with at least one drying chamber outlet. The gas loop may be fluidly coupled with at least one drying chamber inlet. The gas loop may comprise a heat exchanger serially coupled with at least one drying chamber outlet and at least one drying chamber inlet. The heat exchanger may comprise a heat sink. The gas loop may comprise a gas inlet port. The gas loop may comprise a particulate filter serially coupled with at least one drying chamber outlet and at least one drying chamber inlet. The apparatus may comprise a flange configured to be fluidly coupled with the drying chamber. The drying chamber may be fluidly coupled with the flange by a discharge valve. The flange fluidly coupled with the drying chamber may be configured to be fluidly coupled with a biochar processing system. The apparatus may further comprise a control system configured to cool hot biochar. Cooling hot biochar may comprise operably couple one or more discharge valve and one or more feed mechanism to receive hot biochar in the cooling chamber, inject cool steam from the steam loop into the cooling chamber to cool the hot biochar, retain the cool steam and biochar in the cooling chamber until the biochar is cooled to a predetermined temperature, direct the cooled biochar into the drying chamber, inject dry gas from the gas loop into the drying chamber to dry the moist biochar, retain the dry gas and biochar in the drying chamber until the biochar is dried to a predetermined moisture level, and discharge the dried cooled biochar from the drying chamber.

The hydrocarbon gas direct biochar cooling apparatus comprises a processing chamber. The hydrocarbon gas direct biochar cooling apparatus comprises a cooling chamber configured to be fluidly coupled with the processing chamber. The processing chamber comprises at least one inlet. The processing chamber comprises at least one outlet. The cooling chamber comprises at least one inlet. The cooling chamber comprises at least one outlet. The apparatus may comprise a discharge valve configured to fluidly couple the processing chamber with the cooling chamber. The apparatus may comprise a flange configured to be fluidly coupled with the processing chamber. The processing chamber may be fluidly coupled with the flange by a discharge valve. The flange fluidly coupled with the processing chamber may be configured to be fluidly coupled with a gasifier. The flange configured to be fluidly coupled with the gasifier may be fluidly coupled with the processing chamber by a discharge valve. The apparatus may comprise at least one feed mechanism configured to be fluidly coupled with at least one discharge valve. The at least one feed mechanism may be configured to be fluidly coupled with the processing chamber. The at least one feed mechanism may be configured to be fluidly coupled with the cooling chamber. The apparatus may comprise a heating element thermally coupled with the processing chamber. The apparatus may comprise the processing chamber thermally coupled with process heat to receive heat from a gasification process or from biochar cooling. The processing chamber may be thermally coupled with a heat exchanger. The heat exchanger may comprise a heat sink. The heat exchanger may be configured to extract heat from exhaust gas. The heat exchanger may be configured to extract heat from the cooling chamber. The cooling chamber may comprise at least one gas inlet port. The apparatus may comprise at least one cooling chamber outlet coupled with a particulate filter. The apparatus may comprise at least one cooling chamber outlet coupled with a gas chromatograph. The apparatus may comprise at least one cooling chamber outlet coupled with a $CO_2$ removal filter. The apparatus may comprise at least one cooling chamber outlet coupled with an $H_2$ removal filter. The particulate filter may be serially coupled with the $CO_2$ removal filter. The particulate filter may be serially coupled with the $H_2$ removal filter. The $CO_2$ removal filter may be serially coupled with the $H_2$ removal filter. The $CO_2$ removal filter may have a mixed gas outlet. The $CO_2$ removal filter may have a $CO_2$ outlet. The $H_2$ removal filter may have a mixed gas outlet. The $CO_2$ removal filter may have an $H_2$ outlet. The apparatus may comprise a flange configured to be fluidly coupled with the cooling chamber. The cooling chamber may be fluidly coupled with the flange by a discharge valve. The flange fluidly coupled with the cooling chamber may be configured to be fluidly coupled with a biochar processing system. The apparatus may comprise a tail gas recycle loop. The tail gas recycle loop may fluidly couple at least one cooling chamber gas inlet port with at least one removal filter mixed gas outlet. The at least one removal filter mixed gas outlet coupled with the at least one cooling chamber gas inlet port may be an $H_2$ removal filter mixed gas outlet. The removal filter mixed gas outlet coupled with the at least one cooling chamber gas inlet port may be a $CO_2$ removal filter mixed gas outlet. The tail gas recycle loop may fluidly couple at least one cooling chamber gas inlet port with at least one removal filter mixed gas outlet and a thermal oxidizer. The thermal oxidizer may be thermally coupled with a heat exchanger that is configured to be thermally coupled with the processing chamber. The apparatus may further comprise a control system configured to cool hot biochar. Cooling hot biochar may comprise operably couple one or more discharge valve and one or more feed mechanism to receive hot biochar in the processing chamber, process the biochar based on heating the biochar in the processing chamber, retain the biochar in the processing chamber for a predetermined time or until the biochar reaches a predetermined temperature, direct the biochar in the processing chamber into the cooling chamber, inject cool gas from the gas inlet port into the cooling chamber to cool the biochar, retain the gas and biochar in the cooling chamber until the biochar is cooled to a predetermined temperature, and discharge the cooled biochar from the cooling chamber.

The method may comprise steam direct biochar cooling. The method may comprise hydrocarbon gas direct biochar cooling. The method may comprise hydrocarbon gas direct biochar cooling with tail gas recycling.

The steam direct biochar cooling method may comprise receiving hot biochar in a cooling chamber, injecting cool steam into the cooling chamber, retaining the cool steam and biochar in the cooling chamber until the biochar is cooled to a predetermined temperature, directing the cooled biochar into the drying chamber, injecting dry gas into the drying chamber, retaining the dry gas and biochar in the drying chamber until the biochar is dried to a predetermined moisture level, and discharging the dried cooled biochar from the drying chamber. Receiving hot biochar in the cooling chamber may comprise operably coupling one or more discharge valve and one or more feed mechanism to receive the hot biochar. Injecting cool steam into the cooling chamber may comprise injecting cool steam from the steam loop into the cooling chamber to cool the hot biochar. Injecting dry gas into the drying chamber may comprise injecting dry gas from the gas loop into the drying chamber to dry the moist biochar. Discharging the dried cooled biochar from the drying chamber may comprise operably coupling one or more discharge valve to discharge the dried cooled biochar.

The hydrocarbon gas direct biochar cooling method may comprise receiving hot biochar in a processing chamber, processing the biochar based on heating the biochar in the processing chamber, retaining the biochar in the processing chamber until the biochar reaches a predetermined temperature, directing the biochar in the processing chamber into the cooling chamber, injecting cool gas into the cooling chamber to cool the biochar, retaining the gas and biochar in the cooling chamber until the biochar is cooled to a predetermined temperature, and discharging the cooled biochar from the cooling chamber. The method may comprise removing $CO_2$ from gas directed from the cooling chamber to a $CO_2$ removal filter. The method may comprise removing $H_2$ from gas directed from the $CO_2$ removal filter to an $H_2$ removal filter. The method may comprise recovering tail gas from the $H_2$ removal filter mixed gas outlet. The method may comprise recycling the tail gas through a tail gas recycle loop. Recycling the tail gas may comprise fluidly coupling at least one cooling chamber gas inlet port with the $H_2$ removal filter mixed gas outlet through the tail gas recycle loop. Recycling the tail gas may comprise fluidly coupling at least one cooling chamber gas inlet port with the $H_2$ removal filter mixed gas outlet and a thermal oxidizer through the tail gas recycle loop. The method may comprise recycling heat. Recycling heat may further comprise recycling heat generated from the tail gas by the thermal oxidizer. The method may comprise applying the heat generated from the tail gas by the thermal oxidizer to the processing chamber.

Various direct biochar cooling implementations may achieve one or more technical effect. For example, some direct biochar cooling implementations may reduce installation, component, or maintenance cost. This facilitation may be a result of a direct biochar cooling implementation designed to directly cool biochar using cool gas comprising steam or hydrocarbons, without a need for additional components to cool the biochar, such as, for example, a heat exchanger, or a cooling tower. Some direct biochar cooling implementations may reduce operation cost. Such reduced operation cost may be a result of a direct biochar cooling implementation designed to directly cool biochar using cool gas comprising steam or hydrocarbons, without requiring additional energy inputs to cool the biochar using additional cooling components. In some direct biochar cooling designs, valuable byproducts may be produced. For example, biochar produced by steam direct cooling may be valued at a higher price point than standard biochar produced by indirect cooling, and the biochar produced by steam direct cooling may be a competitive alternative to activated carbon. Such higher-valued biochar produced by steam direct cooling may be a result of greater biochar surface area relative to standard biochar produced by indirect cooling.

Some direct biochar cooling implementations may produce biochar valued as a high-grade carbon manufacturing input. For example, biochar produced by some hydrocarbon direct cooling implementations may be valued at a higher price point than standard biochar. This facilitation may be a result of high grade carbon growth from the decomposition of $CH_4$ in the gas, produced by hydrocarbon direct cooling of the biochar. Some direct biochar cooling implementations may produce a value-add chemical byproduct. Such a value-add chemical byproduct may be a result of recycling and selling cooled hydrocarbon captured from an exemplary hydrocarbon direct cooling implementation. Various direct biochar cooling implementations may enhance biochar quality. Such enhanced biochar quality may be a result of directly cooling hot biochar resulting from gasification. Some direct biochar cooling implementations may capture hydrogen resulting from gasification. Such captured hydrogen production may enhance the efficiency of transition from a carbon-based economy, and improve the usefulness of gasification technology.

In the case of hydrocarbon direct biochar cooling, a portion of the hydrocarbon gas may decompose with carbon attaching to biochar and hydrogen flowing through in the hot hydrocarbon mixed gas. The hot hydrocarbon mixed gas may be cooled, and hydrogen may be stripped out or captured with a filter. In an illustrative example, ten percent or more hydrogen may be required to commercially apply such an exemplary filtration approach and recycle the cooled hydrocarbon mixed gas back to the direct cooling step, with make-up from the pipeline, wellhead, digester, or the like, to repeat the process. In an illustrative example, this recovered hydrogen may be sold as a value-add chemical byproduct of an exemplary hydrocarbon direct biochar cooling system.

In an illustrative example, a direct biochar cooling implementation in accordance with the present disclosure may directly cool hot biochar resulting from gasification, and in the process, enhance the biochar quality, or enhance the biochar quality and generate hydrogen.

In some implementations, an exemplary biochar and bio fly ash cooling apparatus may be a counter flow, direct contact exchange system operating on principles similar to a standpipe. An exemplary apparatus may include a metal cylinder of an appropriate composition for the conditions, but may require a refractory or other lining for high temperature operation. In various examples illustrative of the design and usage of various biochar cooling implementations in accordance with the present disclosure, solids may enter the top of an exchanger and flow via gravity through the cooler, exiting at the bottom. In such an example, the gas stream may enter the cooler near the bottom of the cooler, and flow upward through the solids. The gas may also serve to fluidize the solids, enhancing the solids' flow through the cooler. In various exemplary implementations, the method of introducing the gas may vary depending on, for example, flow and cooler size, however the method of introducing the gas may either utilize a gas distributor in larger systems, or fluidization nozzles at the wall for smaller coolers. The gas may exit near the top of the cooler. Depending on application, a separation device, such as a small cyclone or filter, may be needed to disengage the gas and solids at the gas exit.

In another aspect, a method to activate and cool biochar may comprise: receiving biochar (809) into a processing vessel (803) configured with multiple independently temperature-controlled chambers and counter-flow steam injection; controlling activation levels of the biochar (809) by moving the biochar (809) through the processing vessel (803) and adjusting the temperature of the biochar (809) by steam (831) injection into at least one temperature-controlled chamber of the processing vessel (803); recovering volatiles driven off through dehydration using a thermal oxidizer (505); cooling the biochar (809) to a desired discharge temperature using steam (831) and retention time; and discharging an activated biochar product (833).

Receiving biochar (809) may further comprise receiving biochar (809) from a downdraft gasifier (600).

The processing vessel (803) may further comprise a calciner, a rotary calciner, or a kiln.

The method may further comprise sweeping volatile gases to a thermal oxidizer (505) using a vacuum system and counter-flow saturated steam (831).

The multiple independently temperature-controlled chambers configured in the processing vessel (803) may further comprise a processing vessel heating section (824) and a processing vessel cooling section (827).

The temperature range of the processing vessel heating section (824) may be (750° F.-2200° F. or 400° C.-1200° C.).

The processing vessel (803) may further comprise a processing vessel inlet (806) disposed at a processing vessel head (1100) wherein the processing vessel inlet (806) is configured to be fluidly coupled with the processing vessel heating section (824), and a processing vessel outlet (830) disposed at a processing vessel tail (1120) wherein the processing vessel outlet (830) is configured to be fluidly coupled with the processing vessel cooling section (827).

Receiving biochar (809) may further comprise receiving biochar (809) into the processing vessel heating section (824).

Discharging the activated biochar product (833) may further comprise discharging the activated biochar product (833) from the processing vessel cooling section (827).

The processing vessel (803) may further comprise a control system (925) configured to adjust the temperature of biochar (809) using the processing vessel heating section (824).

The control system (925) may further comprise configuration to govern retention time of biochar (809) in the processing vessel (803) based on controlling fluid coupling of the processing vessel heating section (824) with the processing vessel cooling section (827).

The control system (925) may further comprise configuration to determine the temperature in the at least one temperature-controlled chamber of the processing vessel (803).

Adjusting the temperature of the biochar (809) retained by at least one temperature-controlled chamber of the processing vessel (803) may further comprise using the control system (925) to release biochar (809) from the processing vessel heating section (824) into the processing vessel cooling section (827) in response to the control system (925) determining the temperature in the processing vessel heating section (824) is at least a predetermined minimum temperature.

Adjusting the temperature of the at least one temperature-controlled chamber of the processing vessel (803) may further comprise using the control system (925) to retain biochar (809) in the at least one temperature-controlled chamber of the processing vessel (803) until the control system (925) determines the temperature of the at least one temperature-controlled chamber of the processing vessel (803) satisfied at least a predetermined minimum temperature for at least a predetermined minimum period of time.

Adjusting the temperature of the at least one temperature-controlled chamber of the processing vessel (803) may further comprise cooling the biochar (809) based on increasing biochar (809) retention time in the at least one temperature-controlled chamber of the processing vessel (803) using the control system (925).

The control system (925) may further comprise configuration to adjust the temperature of biochar (809) using the processing vessel (803) heating section (824) to heat the biochar (809) to a predetermined target temperature in response to the control system (925) determining the biochar (809) temperature is less than a predetermined minimum.

The control system (925) may further comprise configuration to adjust the temperature of biochar (809) using the processing vessel (803) cooling section (827) to cool the biochar (809).

Adjusting the temperature of the biochar (809) retained by at least one temperature-controlled chamber of the processing vessel (803) may further comprise heating the at least one temperature-controlled chamber of the processing vessel (803) using processing vessel heating means (905).

The processing vessel heating means (905) may further comprise an electric heating element.

The processing vessel heating means (905) may further comprise recovered process heat.

Receiving biochar (809) may further comprise receiving biochar (809) from a cyclone (812).

The method may further comprise heating biochar (809) using a processing vessel heating means (905) to heat a processing vessel heating section (827).

The method may further comprise cooling biochar (809) by injecting steam (831) into a processing vessel cooling section (827).

The processing vessel (803) may be configured with three distinct temperature-controlled sections comprising a heating section (824), a steam injection/activation chamber, and a cooling chamber (827).

The processing vessel (803) may be configured to cause received biochar (809) to flow in a direction from a processing vessel inlet (806) to a processing vessel outlet (830) while flowing through, in sequence, a heating section (824), a steam injection/activation chamber, and a cooling chamber (827).

The method may further comprise enhancing and controlling activation levels of carbon in the biochar (809) using steam (831) injected into the processing vessel (803).

The method may further comprise sweeping volatile gases from the biochar (809) using the injected steam (831).

The method may further comprise decomposing the volatile gases swept from the biochar (809) using a thermal oxidizer (505).

The method may further comprise injecting steam (831) further comprising saturated steam.

The method may further comprise forming additional macro and micro pores in the activated biochar product (833) using the injected steam (831).

The method may further comprise adjusting an injection rate of the injected steam (831) to control the size and number of macro and micro pores in the activated biochar product (833), using the control system (925).

The activated biochar product (833) may further comprise graphene.

The activated biochar product (833) may further comprise activated carbon.

The method may further comprise the processing vessel (803) is configured to cause received biochar (809) to flow in a direction from a processing vessel inlet (806) to a processing vessel outlet (830).

The method may further comprise the processing vessel (803) is configured to cause injected steam (831) to flow in a direction counter to the biochar (809) flow.

Throughout this disclosure, the term "fluid" is used interchangeably with the term "gas." For example, an element that is "fluidly coupled" or "fluidly connected" or in "fluid communication" is capable to or would be capable to be in a coupled, connected, or communication mode with respect to gas, fluid, gas and fluid, gas or fluid, or any combination or mixture of gas or fluid. Throughout this disclosure, an element that is "fluidly coupled" or "fluidly connected" or in "fluid communication," as the terms are used herein, is also capable to or would be capable to be in a coupled, connected, or communication mode with respect to fluid, solids, fluid and solids, fluid or solids, or any combination or mixture of fluid or solids.

The details of various aspects are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

Figure 5:
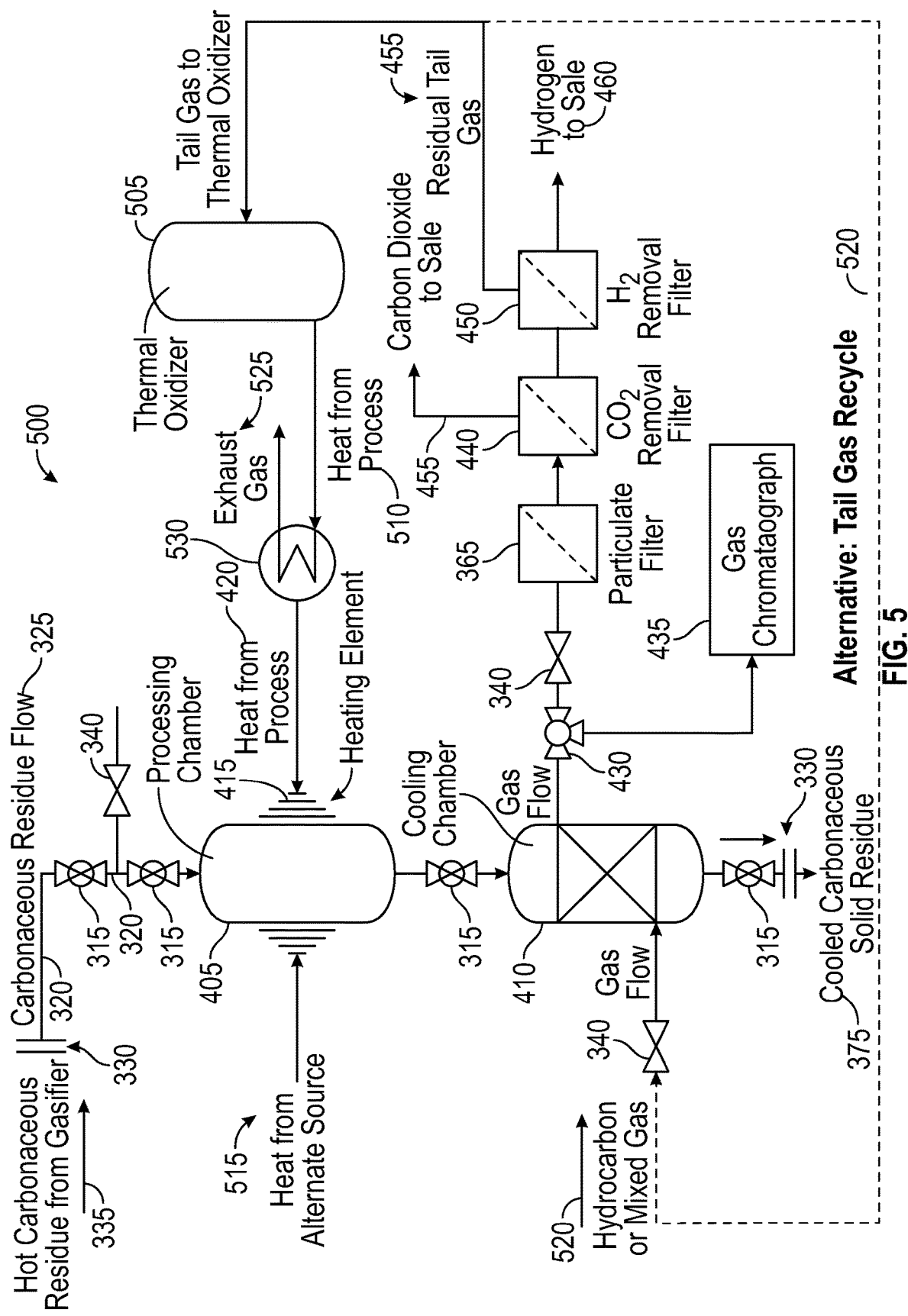
FIG. 5 depicts a schematic of exemplary direct cooling of hot biochar with cool hydrocarbon gas as the hot biochar exits a gasifier or cyclone, with exemplary tail gas recycling.
Figure 6:
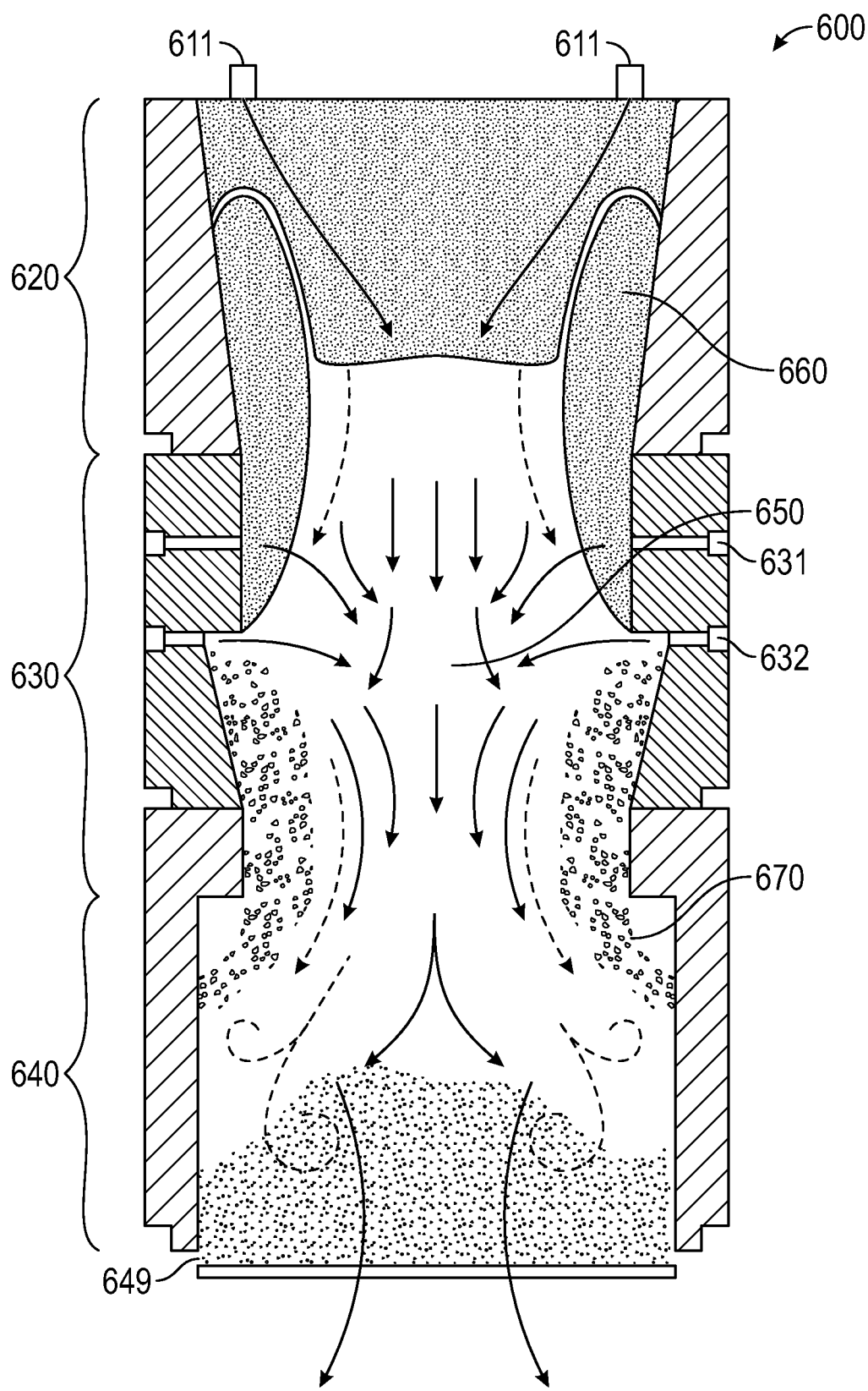
FIG. 6 depicts an exemplary downdraft gasifier implementation in accordance with the present disclosure.
Figure 7:
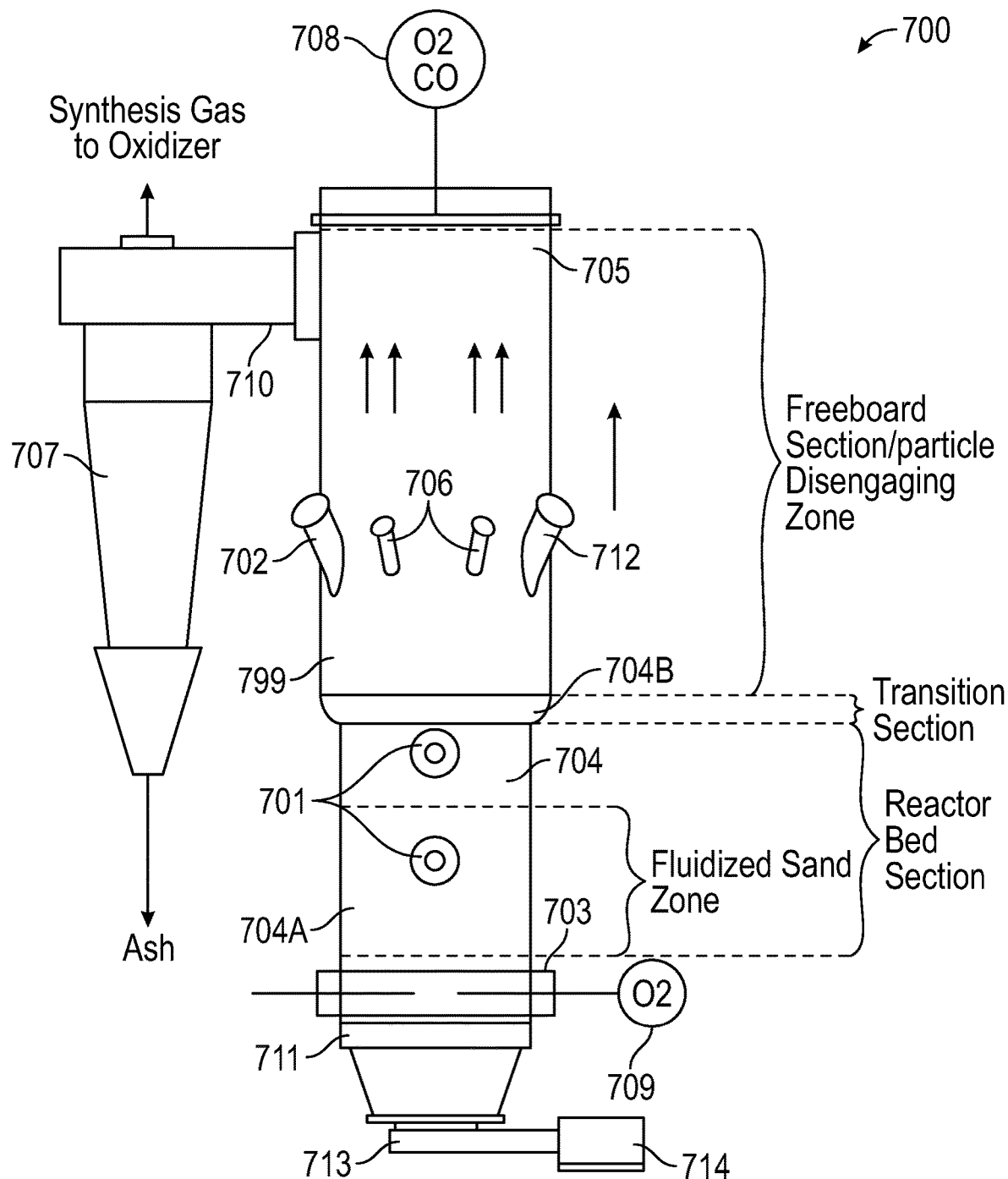
FIG. 7 depicts an exemplary fluidized bed gasifier implementation in accordance with the present disclosure.

To aid understanding, this document is organized as follows. First, catalytic methane decomposition and creation of nanocarbon tubes [chemical vapor deposition] and hydrogen gas are briefly introduced with reference to FIGS. 1-2. Second, with reference to FIGS. 3-5, the discussion turns to exemplary implementations that illustrate direct biochar cooling designs. Specifically, direct biochar cooling implementations designed to cool biochar based on steam and hydrocarbon gas applied directly to biochar are disclosed. Then, with reference to FIGS. 6-7, illustrative downdraft and fluidized bed gasifier implementations are presented, to explain applications of direct biochar cooling technology. Finally, with reference to FIGS. 8-11, exemplary biochar activation and cooling designs are disclosed, to present improvements in biochar processing technology.

It is to be understood that the specific devices and processes illustrated in the attached drawings and described in the following specification are exemplary implementations of the inventive concepts defined in the appended claims. Hence, specific dimensions and other physical characteristics relating to the implementations disclosed herein are not to be considered as limiting, unless the claims expressly state otherwise.

Figure 1:
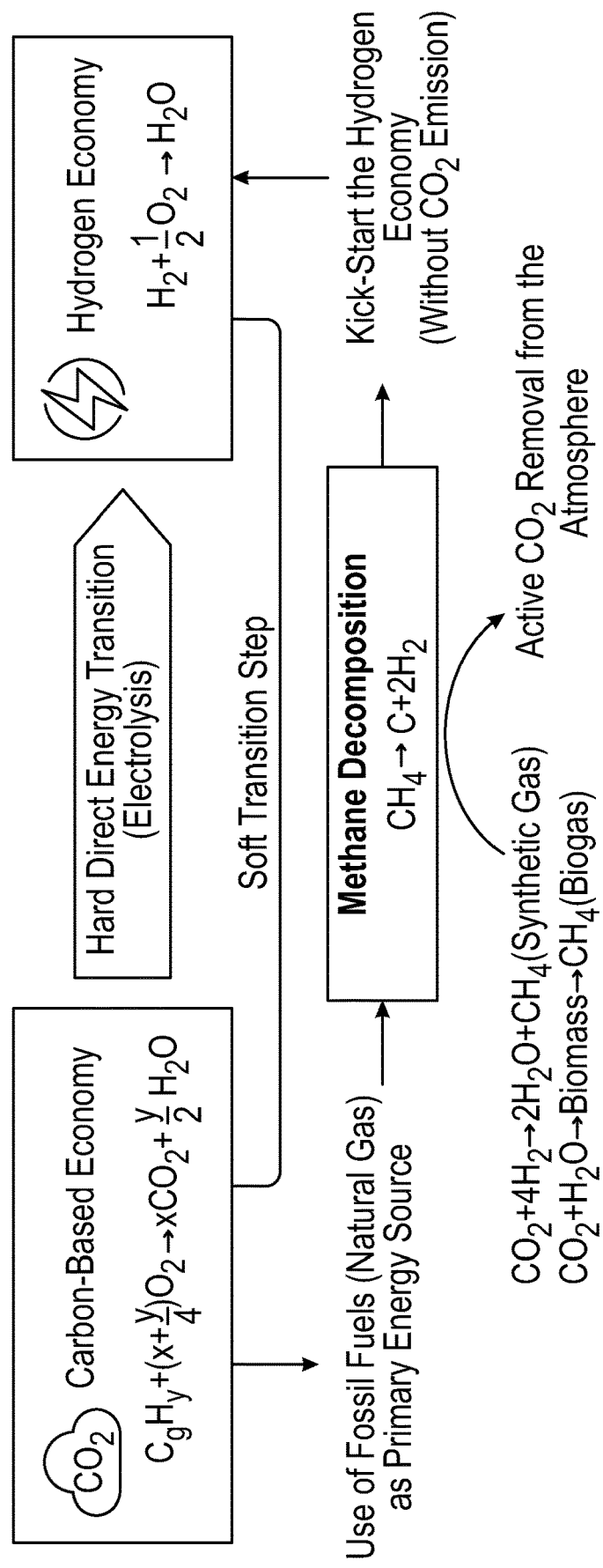
FIG. 1 depicts a schematic of exemplary catalytic methane decomposition.

FIG. 1 depicts a schematic of exemplary catalytic methane decomposition. In FIG. 1, the exemplary catalytic methane decomposition process comprises low-temperature cracking of methane, producing CON-free hydrogen and solid carbon. Catalytic methane decomposition has the unique potential to make the swift transition for a fully decarbonized economy and beyond: the methane decomposition of biomethane removes $CO_2$ from the atmosphere at competitive cost.

Figure 2:
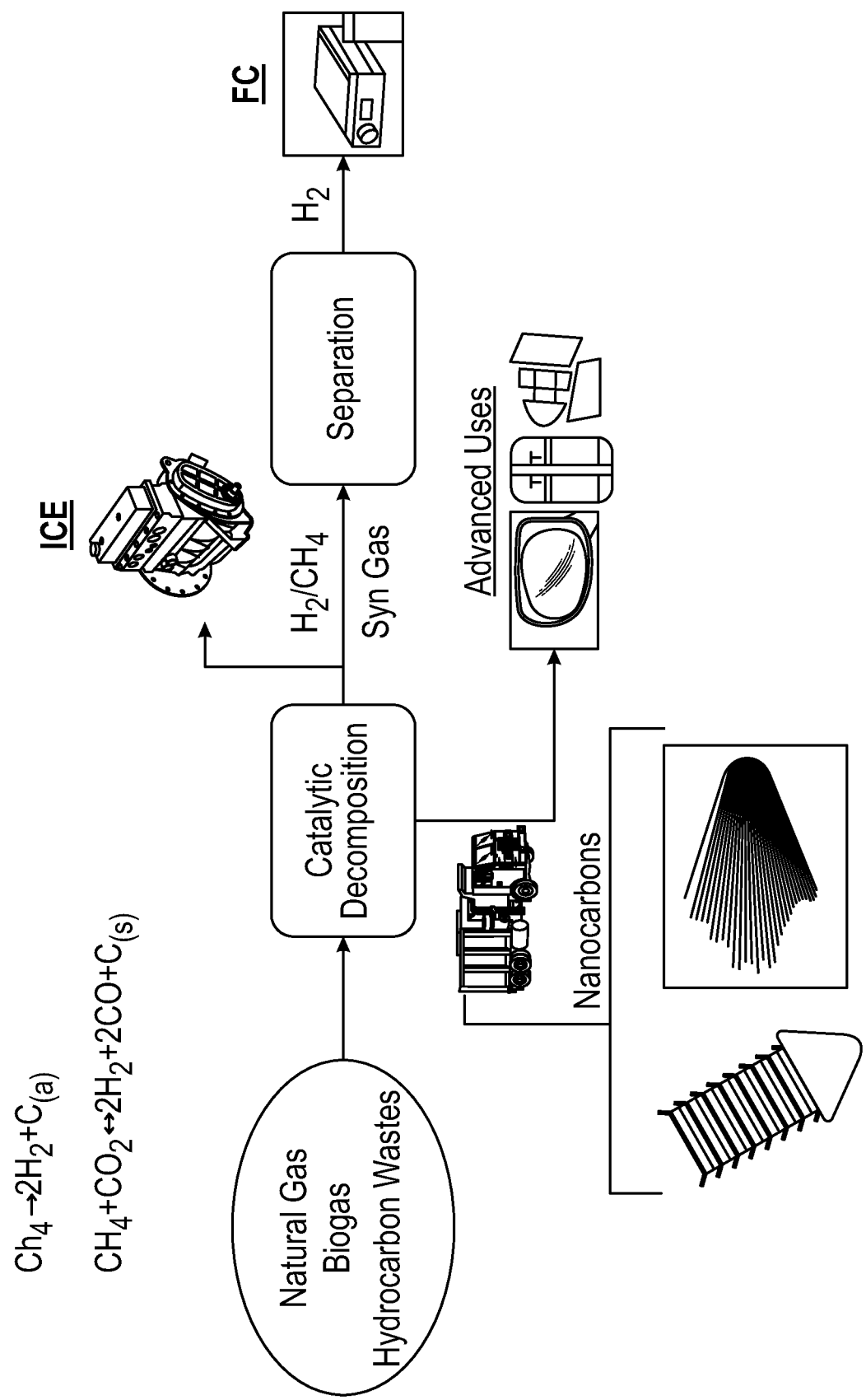
FIG. 2 depicts a schematic of exemplary nanocarbon and hydrogen gas creation.

FIG. 2 depicts a schematic of exemplary nanocarbon and hydrogen gas creation. In FIG. 2, gas comprising methane is decomposed by methane decomposition. The gas comprising methane may be decomposed by methane decomposition as a result of being run over a catalyst containing carbon in a heated reactor, to produce hydrogen and carbon nanotubes/nano-onions/graphite. Examples of catalysts commonly used for methane decomposition may include at least nickel, cobalt, iron ore, or hematite iron ore. The gas comprising methane may be decomposed by methane decomposition as a result of being run over a thermochemically converted carbonaceous material in a heated vessel, which decomposes the methane into hydrogen and carbon. The hydrogen may remain in gaseous form. The hydrogen may be recovered.

The carbon may aggregate in solid form with carbonaceous residue. The carbon may be recovered. Gasification is a thermochemical process in which the reactions between fuel and the gasification agent take place and syngas (also known as producer gas, product gas, synthetic gas, or synthesis gas) is produced. The syngas may be mainly composed of CO, $H_2$, $N_2$, $CO_2$, and some hydrocarbons ($CH_4$, $C_2H_4$, $C_2H_6$, and the like).

Figure 3:
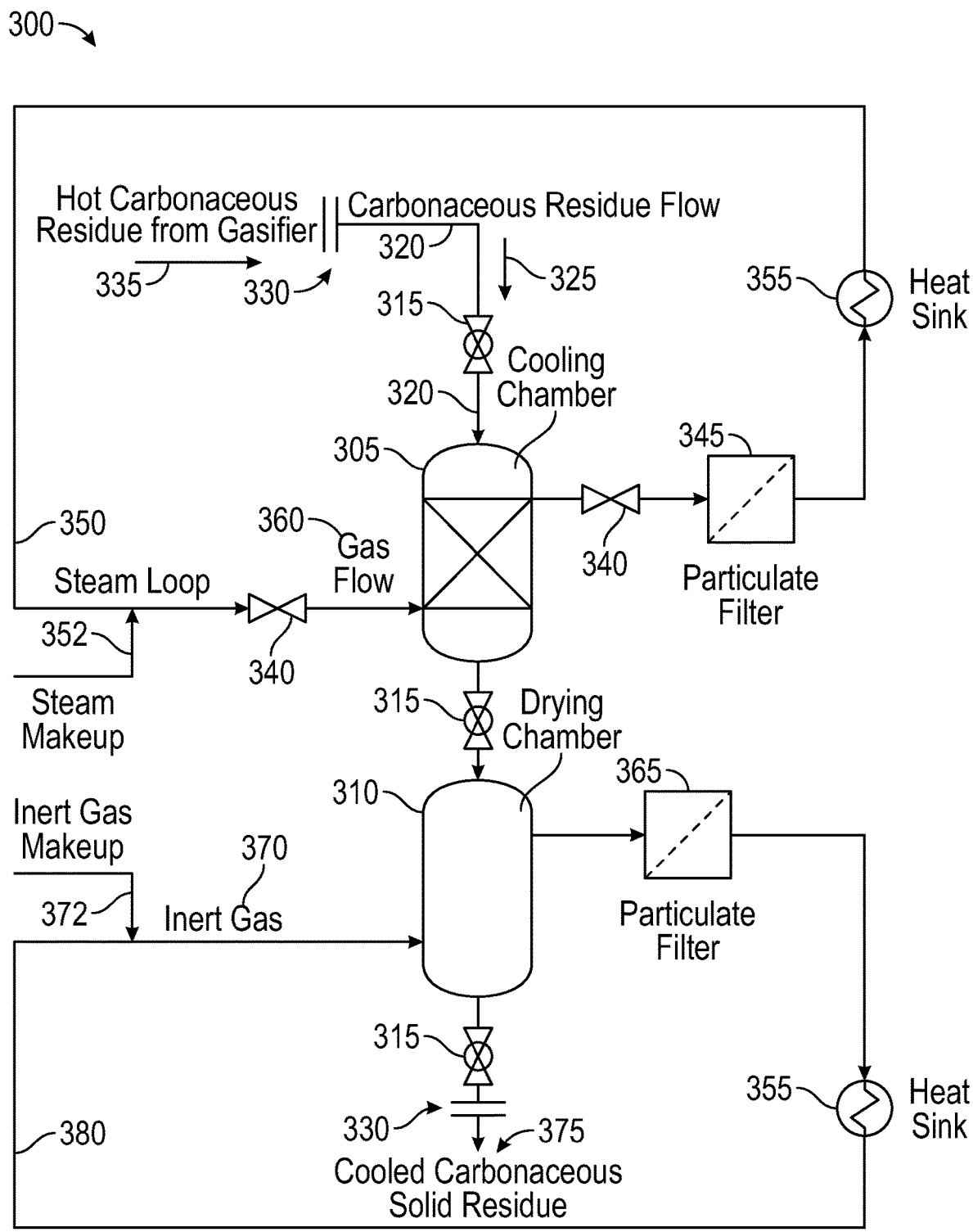
FIG. 3 depicts a schematic of exemplary direct cooling of hot biochar with cool dry steam as the hot biochar exits a gasifier or cyclone, enhancing the surface area of the biochar.

FIG. 3 depicts a schematic of exemplary direct cooling of hot biochar with cool dry steam as the hot biochar exits a gasifier or cyclone, enhancing the surface area of the biochar. In the steam direct biochar cooling implementation 300 depicted by FIG. 3, hot carbonaceous solid residue ("hot biochar") 335 is expelled from a gasifier. The gasifier may be a downdraft gasifier. The gasifier may be a fluidized bed gasifier. The downdraft gasifier may be, for example, the exemplary downdraft gasifier 600 described at least with reference to FIG. 6. The fluidized bed gasifier may be, for example, the exemplary fluidized bed gasifier 700 described at least with reference to FIG. 7. The gasifier may be operably connected with the steam direct biochar cooling implementation 300 by the flange 330. In an illustrative downdraft gasifier example, hot carbonaceous residue from the downdraft gasifier ("hot biochar") 335 may be expelled from the downdraft gasifier through the flange 330. In an illustrative fluidized bed gasifier example, hot carbonaceous residue from the gasifier ("hot biochar") 335 may be expelled from the gasifier cyclone through the flange 330. In the illustrated example, the hot biochar 335 is expelled from the gasifier through the flange 330 and the feed mechanism 320 to the solid residue discharge valve 315 directing the biochar flow 325 into the cooling chamber 305. In the example depicted by FIG. 3, the cooling chamber 305 is configured with the direct steam 360 input interface valve 340 fed by recycled steam from the steam recycling loop 350. In the illustrated example, steam from the alternative steam makeup 352 port is injected into the steam recycling loop 350.

The steam 360 injected into the cooling chamber 305 cools the hot carbonaceous solid residue ("biochar") 335 in the cooling chamber 305. In the depicted example, the cooled biochar 335 is then directed from the bottom of the cooling chamber 305 into the drying chamber 310 through the discharge valve 315. During an exemplary cooling step, moisture from the steam 360 may be physically caught in the cooling biochar 335 depending on the pore space and reactivity of the biochar 335. In the illustrated example, the cooling steam 360 stream is directed from the cooling chamber 305 through the particulate steam filter 345 to remove particulates from the steam 360. The particulate steam filter 345 may be a hot gas ceramic or sintered metal particulate filter. In the depicted example, the steam 360 filtered by the particulate steam filter 345 is cooled in the steam recycling loop 350 using steam to liquid heat exchange between the steam recycling loop 350 and the environment. The heat exchange may be enhanced by the heat sink 355 configured in the steam recycling loop 350. The heat exchange may be enhanced by the steam injected from the steam makeup port 352 into the steam recycling loop 350. For example, the steam makeup port 352 steam may be a different temperature than the steam 360 in the steam recycling loop 350, to enhance cooling in the steam recycling loop 350. The steam makeup port 352 steam may be provided from the facility. In the depicted example, the cooled steam 360 is re-routed through the steam recycling loop 350 to the cooling chamber 305. Heat from the steam to liquid heat exchange in the steam recycling loop 350 may be captured from the heat sink 355 and used to produce thermal energy for steam, power, or co-heat and power applications within the facility.

In the example depicted by FIG. 3, the drying chamber 310 is configured with the direct inert gas 370 input interface fed by the recycled supply of dry inert gas 370 from the gas loop 380. During an exemplary drying step, moisture caught in the biochar may be swept away, producing the dried cooled biochar 375. In the illustrated example, the inert gas 370 moistened in the drying chamber 310 is directed through the particulate gas filter 365 to remove particulates from the inert gas 370. The particulate gas filter 365 may be a hot gas ceramic or sintered metal filter. In the depicted example, the moistened inert gas 370 from the particulate gas filter 365 is cooled in the gas loop 380. The moistened inert gas 370 from the particulate gas filter 365 may be cooled in the gas loop 380 using a chiller. The moistened inert gas 370 from the particulate gas filter 365 may be cooled in the gas loop 380 using heat exchange between the gas loop 380 and the environment. The moistened inert gas 370 from the particulate gas filter 365 may be cooled in the gas loop 380 using heat exchange enhanced by the heat sink 355 configured in the gas loop 380. Heat from the heat exchange in the gas loop 380 may be captured from the heat sink 355 and used to produce thermal energy for steam, power, or co-heat and power applications within the facility. Makeup inert gas may be injected into the gas loop 380 from makeup inert gas port 372 to enhance cooling the gas 370 or enhance moisture removal from the gas 370. The makeup inert gas injected from makeup inert gas port 372 may have a different moisture level than the gas in the gas loop 380. The makeup inert gas injected from makeup inert gas port 372 may be a different temperature than the gas in the gas loop 380, to enhance cooling in the gas loop 380. In the depicted example, the filtered and cooled inert gas 370 is recycled through the gas loop 380 back to the drying chamber 310. Following the drying chamber 310, the resultant biochar 375 may be directed to existing biochar sizing, handling and storage for 3rd party sale or internal use.

In the example depicted by FIG. 3, the inlet flange 330 that connects the cooling chamber 305 to the gasifier and/or the cyclone via the discharge valve 315 represents the point at which the exemplary steam direct biochar cooling implementation 300 begins. Various steam direct biochar cooling implementation 300 designs may include: i) one or more discharge valve 315 from the gasifier and/or the cyclone(s), ii) one or more feed mechanism 320 from the discharge valve 315 to the cooling chamber 305, iii) the cooling chamber 305, iv) one or more hot gas ceramic or sintered metal filter 345 for the removal of particulates from the steam post cooling, v) the steam recycling loop 350 system with heat exchange and steam makeup port 352, vi) the drying chamber 310, vii) one or more hot gas ceramic or sintered metal filter 365 for the removal of particulates from the inert gas post drying, viii)) the inert gas loop 380 recycling system with heat exchange and gas make-up 372, and ix) piping, conduit, wiring, and control systems to effectuate all of the described functions.

In the depicted example, the drying chamber 310 is connected by the outlet discharge valve 315 with the outlet flange 330 through which the cooled carbonaceous solid residue ("cooled biochar") 375 is expelled. In the illustrated example, the particulate steam filter 345 or the particulate gas filter 365 may be configured with a particulate removal valve connected with the filters by a flange 330 (not shown). In the depicted example, the steam recycling loop 350 or the gas loop 380 may be configured with a heat exchanger comprising one or more heat sink 355. The heat exchanger configured in the steam recycling loop 350 may be connected with the particulate steam filter 345 by a flange 330 (not shown). The heat exchanger configured in the gas loop 380 may be connected with the particulate gas filter 365 by a flange 330 (not shown). In an example illustrative of various steam direct biochar cooling implementations in accordance with the present disclosure, the flange 330 connections proximal to the drying chamber 310, flange 330 connections to the filters, the steam makeup port 352, and the inert gas makeup port 372 represent points at which the exemplary steam direct biochar cooling implementation 300 may end.

In an illustrative example, the depicted steam direct biochar cooling implementation 300 may permit a more cost-effective means of cooling gasification hot carbonaceous solid residues.

For example, a steam direct biochar cooling implementation in accordance with the present disclosure may take advantage of the physical and compositional properties of the gasification hot carbonaceous solid residue and the compositional properties of the steam and inert gas, to augment the resultant hot carbonaceous solid residue that renders the resultant biochar more suitable for certain product applications, increasing the biochar's overall commercial value.

Various steam direct biochar cooling implementations in accordance with the present disclosure may utilize recycling loops to minimize water and inert gas resource inputs, and improve the efficiency of energy usage by biochar cooling.

Some steam direct biochar cooling implementations in accordance with the present disclosure may be configured with one or more heat exchanger designed to maximize process heat recovery, and minimize energy resource inputs.

A steam direct biochar cooling implementation in accordance with the present disclosure may include a dutchman style feed system setup on the bottom of the discharge valve(s) to provide flow variances between the gasifier and the cooling chamber. Some steam direct biochar cooling implementations in accordance with the present disclosure may include hot gas particulate removal systems, such as, for example, a bag house system, or quench scrubber system, applied as an alternative to a hot gas ceramic or sintered metal filter.

In an illustrative example, a steam direct biochar cooling implementation in accordance with the present disclosure may be configured to receive independently produced and heated biochar, using the biochar as a means to convert that heated biochar into a biochar different in composition and physical format from the original biochar, for specific product applications.

In an illustrative example, pre-cooling of the cooling gas media prior to cooling chamber injection may be employed to ensure the stream is sufficiently cooled to reduce the temperature of the gasification hot carbonaceous solid residue (hot biochar). Some implementations may adjust the moisture content of the stream to prevent the stream from becoming too wet. A stream that is too wet may cause the creation of a residue slurry that cannot be effectively dried by inert gas drying, if, for example, the inert gas is not dry enough to sweep the caught moisture from the gasification cooled carbonaceous solid residue (cooled biochar); or if carry over of too many particulates in the steam post cooling or inert gas post drying impede the filtration systems' ability to effectively remove particulates prior to the recycling loops.

In an illustrative example, component parts may comprise sufficient quality steel material to account for the pressures (1-500 psig/1-35 Bar), temperatures (212°-1500° F. or 100°-800° C.) and corrosiveness of the substances involved. In an illustrative example, one could expect to utilize at least some component parts comprising stainless steel in an exemplary implementation in accordance with the present disclosure, to account for the operational pressures and temperatures expected.

An exemplary steam direct biochar cooling implementation may take advantage of temperature, pressure, and composition of the gasification hot carbonaceous material (hot biochar), the cooling steam and the drying inert gas, to create cooled biochar with high value application opportunities.

Figure 4:
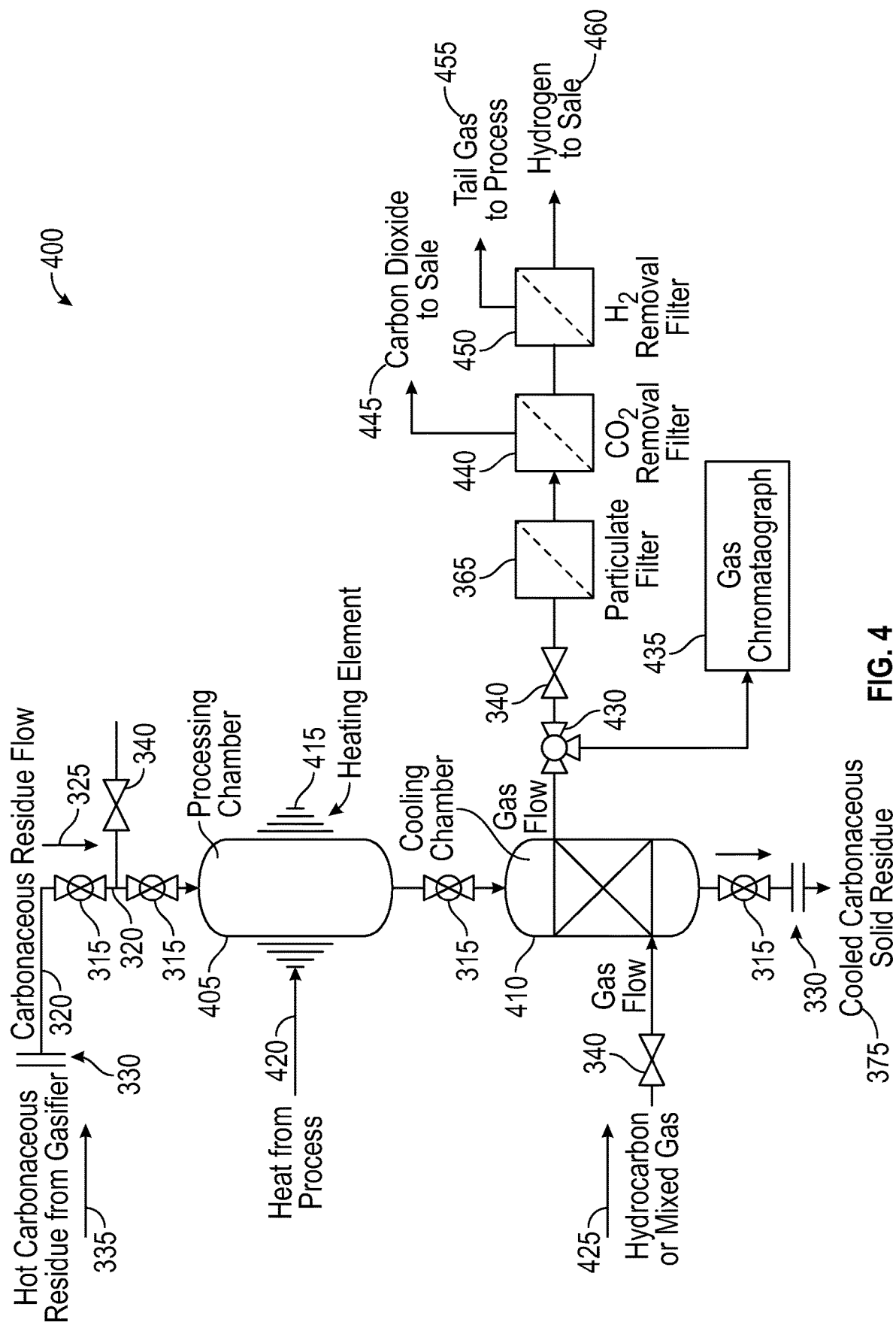
FIG. 4 depicts a schematic of exemplary direct cooling of hot biochar with cool hydrocarbon gas as the hot biochar exits a gasifier or cyclone, enhancing the high-quality carbon content of the biochar with nano tube type carbon formation on the biochar [chemical vapor deposition], and producing a gas stream that may be filtered to recover hydrogen.

FIG. 4 depicts a schematic of exemplary direct cooling of hot biochar with cool hydrocarbon gas as the hot biochar exits a gasifier or cyclone, enhancing the high-quality carbon content of the biochar with nano tube type carbon formation on the biochar, and producing a gas stream that may be filtered to recover hydrogen. FIG. 5 depicts a schematic of exemplary direct cooling of hot biochar with cool hydrocarbon gas as the hot biochar exits a gasifier or cyclone, with exemplary tail gas recycling.

In FIG. 4, the depicted hydrocarbon gas direct biochar cooling implementation 400 is configured to cool hot biochar 335 based on direct application of heat, pure hydrocarbon gas streams, or mixed gas streams (such as, for example, natural gas, biogas, well head gas and coal bed methane, or the like) to produce the cooled biochar 375 that is different in composition and physical format from biochar produced by indirect processing and cooling. In an illustrative example, this resultant cooled biochar 375 produced based on direct application of heat, pure hydrocarbon gas streams or mixed gas streams to the hot biochar 335 may be more suitable for certain product applications. For example, in various hydrocarbon gas direct biochar cooling implementations in accordance with the present disclosure, the processing and cooling media may be purified and refined as the hot carbonaceous solid gasification residue is processed and cooled. In an example illustrative of various hydrocarbon gas direct biochar cooling implementation designs, the $CO_2$ content of the cooling gas stream may be extracted utilizing filtration technology adapted from the sour gas and biogas upgrading industry applications. The hydrogen content of the cooled gas stream may be extracted utilizing filtration technology used in hydrogen production technologies. In FIG. 5, the depicted hydrocarbon gas direct biochar cooling implementation 500 further comprises exemplary tail gas recycling features with the direct biochar cooling features described with reference to the hydrocarbon gas direct biochar cooling implementation 400 described with reference to FIG. 4.

In the hydrocarbon gas direct biochar cooling implementation 400 depicted by FIG. 4 and the hydrocarbon gas direct biochar cooling with tail gas recycling implementation 500 depicted by FIG. 5, hot carbonaceous solid residue ("hot biochar") 335 is expelled from a gasifier. The gasifier may be a downdraft gasifier. The gasifier may be a fluidized bed gasifier. The downdraft gasifier may be, for example, the exemplary downdraft gasifier 600 described at least with reference to FIG. 6. The fluidized bed gasifier may be, for example, the exemplary fluidized bed gasifier 700 described at least with reference to FIG. 7. The gasifier may be operably connected by the flange 330 with the hydrocarbon gas direct biochar cooling implementation 400 depicted by FIG. 4, or the hydrocarbon gas direct biochar cooling with tail gas recycling implementation 500 depicted by FIG. 5.

In the hydrocarbon gas direct biochar cooling implementation example depicted by FIG. 4, hot carbonaceous solid gasification residue (biochar) 335 is directed into the processing chamber 405 as the residue (biochar) 335 is expelled from the downdraft gasifier at the solid residue discharge valve(s) 315, or from the downdraft gasifier or the fluidized bed gasifier at the cyclone solid residue discharge valve(s) 315. In the examples depicted by FIGS. 4 and 5, the processing chamber 405 includes the heating element 415. The heating element 415 may be an indirect heating element. The indirect heating element 415 may be a gas/liquid to gas heat exchange that can boost the solids temperature from 400°-800° C. or higher, if necessary, to achieve gasification hot carbonaceous solid residue (biochar) 335 processing temperatures.

In an exemplary cooling step, the hot carbonaceous solid residues (biochar) 335 are next directed to the cooling chamber 410. In the example depicted by FIG. 4, the cooling chamber 410 is configured with the direct gas 425 input interface. The direct gas 425 input interface may be fed, for example, by hydrocarbon gas streams (natural gas, biogas, well head gas and coal bed methane, and the like) from a facility processing unit or a pipeline interconnection. In an illustrative example, the hydrocarbon direct gas 425 reacts with the hot carbonaceous solid residue (biochar) 335 in the cooling chamber 410, cooling the residue (cooling biochar) 335 creating cooled biochar 375 (also known as bio fly ash when recovered from a cyclone) that is then directed from the bottom of the cooling chamber 410. In the depicted example, the processing chamber 405 is configured to receive recovered process heat 420 to enhance the hydrocarbon direct gas 425 reaction with the hot carbonaceous solid residue (biochar) 335 in the cooling chamber 410. The cooled biochar 375 may be directed to a biochar recovery sizing, storage, or packaging system for distribution. In some implementations, the heating element 415 may be deactivated in response to determining the recovered process heat 420 reaches at least a predetermined minimum temperature. In an illustrative example, the heating element 415 may be used to heat biochar 335 in the processing chamber 405. The biochar 335 may be heated in the processing chamber 405 using process heat 420. An exemplary biochar cooling implementation may initially heat biochar 335 in the processing chamber 405 using the heating element 415, deactivate the heating element 415 when the process heat 420 reaches at least a predetermined minimum temperature, and continue heating biochar 335 in the processing chamber using only, or substantially only, process heat 420. In an illustrative example, the process heat 420 may be generated by a thermal oxidizer supplied with tail gas filtered from gas released from the cooling chamber 410.

In various hydrocarbon gas direct biochar cooling implementations in accordance with the present disclosure, during an exemplary cooling step, compounds and elements within the cooling gaseous media such as carbon, hydrogen sulfide, siloxanes, and the like may be physically captured in the cooling carbonaceous solid residue (biochar) 335 or chemically bound in the cooled carbonaceous solid residue (biochar) 375 depending on the pore space or reactivity of the carbonaceous solid residue (biochar) 335, augmenting the compositional aspects of the resultant cooled biochar 375. During the cooling step, physical expansion and reduction activities may alter the physical nature of the resulting carbonaceous solid residue (cooled biochar) 375. Such augmentations may enhance the applicability of the biochar 375 for certain product applications that may take advantage of these physical or compositional aspects of the resultant biochar 375, such as greater surface area, greater cat ion exchange capability, or nano structure carbon formations.

During the cooling step, the temperature of the carbonaceous solid residue (cooling biochar) 335 and/or the catalytic properties of the compositional make-up of the cooling biochar 335 may facilitate chemical reactions with the hydrocarbon gas 425, such as, for example, methane decomposition, forming a resulting mixed gaseous stream suitable for recovery of valuable gas streams, such as, for example, $CO_2$, or hydrogen. In the depicted examples, the resulting mixed gaseous stream exiting the cooling chamber 410 is then directed via the valve 430 through the hot gas ceramic or sintered metal particulate gas filter 365 to remove particulates from the post cooling gaseous media. In the illustrated examples, the valve 430 is a three-way valve configured to permit coupling the gas chromatograph 435 to the valve 430 to measure the chemical composition of the mixed gaseous stream exiting the cooling chamber 410. In the depicted examples, after particulates are filtered from the post cooling gaseous media, the filtered mixed gaseous stream is directed to various filtration systems for the capture, recovery, and beneficial use of these valuable gas streams. In the depicted examples, the filtered mixed gaseous stream is directed from the particulate gas filter 365 output to the $CO_2$ removal filter 440, resulting in the carbon dioxide 445 stream at the $CO_2$ removal filter 440 carbon dioxide output. The carbon dioxide 445 stream filtered from the mixed gaseous stream may be recovered, distributed, or sold. In the depicted examples, the mixed gaseous stream filtered by the $CO_2$ removal filter 440 is directed from the $CO_2$ removal filter 440 mixed gaseous stream output to the $H_2$ removal filter 450, resulting in the tail gas stream 455 and the hydrogen stream 460. In various exemplary hydrocarbon gas direct biochar cooling implementations in accordance with the present disclosure, residual tail gas from the tail gas stream 455 may be recycled within the system, to improve biochar cooling efficiency and reduce harmful impact to the global human environment. In the example depicted by FIG. 5, residual tail gas from the tail gas stream 455 may be cooled via heat exchange and the tail gas may recycled via the tail gas recycle loop 520 back to the cooling chamber 410. In the example illustrated by FIG. 5, residual tail gas from the tail gas stream 455 may also be cooled via heat exchange and directed to the thermal oxidizer 505. In the example depicted by FIG. 5, the tail gas stream 455 directed to the thermal oxidizer 505 permits the thermal oxidizer 505 to produce thermal energy. The thermal energy 510 produced by the thermal oxidizer 505 may then be recovered from the exhaust gas 525 via the heat exchanger 530. In various implementations, the thermal energy 510 recovered from the thermal oxidizer 505 may be employed to heat the processing chamber 405. The processing chamber 405 may be heated by alternate heat source 515. In some implementations, the thermal energy recovered from the thermal oxidizer 505 may be employed to produce thermal energy for heat, power, or co-heat and power applications.

In the examples depicted by FIGS. 4 and 5, the inlet flange 330 that connects the processing chamber 405 to the gasifier and/or the cyclone via the discharge valve 315 represents the point at which the exemplary hydrocarbon gas direct biochar cooling implementations may begin. Various hydrocarbon gas direct biochar cooling implementation 400 or 500 designs may include i) one or more discharge valve 315 from the gasifier and/or the cyclone(s), ii) one or more feed mechanism 320 from the discharge valve 315 to the processing chamber 405 and the cooling chamber 410, iii) the processing chamber 405 and the cooling chamber 410, iv) a biochar recovery sizing, storage, and packaging system (not shown), v) the incorporation/utilization of the hot gas ceramic or sintered metal filter 365 for the removal of particulates from the post cooling gaseous media, vi) the incorporation/utilization of the $CO_2$ removal filter 440 and hydrogen removal filter 450 for the recovery of these gas streams from the post cooling gaseous media, vii), the heat exchange cooling and recycle loop 520, viii) the incorporation/utilization of the thermal oxidizer 505 and the exhaust gas 525 heat exchanger 530 to recover thermal energy 420 from the residual tail gas, to provide process heat 415 to the processing chamber 405 via gas to gas heat exchange, or for the production of heat, power, or co-heat and power and ix) all piping, conduit, and wiring control systems to effectuate all of the described functions.

Various exemplary hydrocarbon gas direct biochar cooling implementations in accordance with the present disclosure may permit more cost-effective processing and cooling of gasification hot carbonaceous solid residue. Such improved gasification hot carbonaceous solid residue processing and cooling cost effectiveness may be a result of a biochar cooling implementation designed to take advantage of the physical and compositional properties of the gasification hot carbonaceous solid residue and the compositional properties of the hydrocarbon gas to cost effectively augment the resultant hot carbonaceous solid residue with elements and compounds that render the resultant biochar more suitable for certain product applications, increasing the biochar's overall commercial value.

An exemplary hydrocarbon gas direct biochar cooling implementation in accordance with the present disclosure may take advantage of the physical and compositional properties of the gasification hot carbonaceous solid residue and the hydrocarbon gas to cost effectively purify and refine the hydrocarbon gas into purified and refined gas streams that may comprise, for example, $CO_2$ or hydrogen, that, through the use of filtration technology, can be captured and recovered for high value beneficial use applications or beneficial sequestration in the context of $CO_2$.

Some exemplary hydrocarbon gas direct biochar cooling implementations in accordance with the present disclosure may include a dutchman style feed system setup on the bottom of the discharge valve(s) to provide flow variances between the gasifier and the processing chamber.

In an exemplary hydrocarbon gas direct biochar cooling implementation in accordance with the present disclosure, the processing chamber and cooling chamber may be configured as one piece of equipment, with a top to bottom gasification hot carbonaceous solid residue flow characteristic.

Alternative hot gas particulate removal systems, such as, for example, a bag house system, or a quench scrubber system, could be applied to the post cooling gaseous media used in some exemplary hydrocarbon gas direct biochar cooling implementations, as an alternative to a hot gas ceramic or sintered metal filter.

In an illustrative example, an alternative gas recovery systems could be applied to the purified and refined cooling gas stream in some hydrocarbon gas direct biochar cooling designs, such as pressure swing adsorption, temperature swing adsorption, amine scrubbing, biological scrubbing, or the like, to capture, recover, and beneficially use the valuable gas streams inherent therein.

In an illustrative example, an exemplary hydrocarbon gas direct biochar cooling implementation in accordance with the present disclosure may be configured to independently heat cooled biochar and use the heated biochar as a means to convert that heated biochar using heat, pure hydrocarbon gas streams, or mixed gas streams (natural gas, biogas, well head gas and coal bed methane, or the like) into a biochar different in composition and physical format from the original biochar, for specific product applications. Various exemplary hydrocarbon gas direct biochar cooling designs may also be used to cost effectively purify and refine hydrocarbon gas streams (natural gas, biogas, well head gas and coal bed methane, or the like) into valuable gas streams for the capture and recovery of $CO_2$ or hydrogen for useful applications or beneficial sequestration in the context of $CO_2$.

Various exemplary hydrocarbon gas direct biochar cooling designs may include pre-cooling of the hydrocarbon prior to cooling chamber injection, to ensure the hydrocarbon is sufficiently cooled to reduce the temperature of the gasification hot solid residue. In an illustrative example, the temperature of gasification hot solid residue (biochar) will have an impact on the biochar's capabilities associated with purifying and refining the cooling media.

In an illustrative example, component parts may comprise sufficient quality steel material to account for the pressures (1-500 psig/1-35 Bar), temperatures (212°-1500° F. or 100°-800° C.) and corrosiveness of the substances involved. In an illustrative example, one could expect to utilize at least some component parts comprising stainless steel in an exemplary implementation in accordance with the present disclosure, to account for the operational pressures and temperatures expected.

An exemplary hydrocarbon gas direct biochar cooling design may take advantage of temperature, pressure, and composition of the gasification hot carbonaceous material (hot biochar) and the hydrocarbon gas to create cooled biochar with high value application opportunities, and enable the capture and recovery of purified and refined high value gas streams for beneficial use, products, production, or sequestration. This facilitation may be a result of a direct biochar cooling implementation designed to avoid sweeping the heat away in the form of a hot transfer media which then must be cooled via a cooling tower arrangement, or discharged as a waste stream in once through cooling applications, which may be disadvantages related to indirect cooling designs that may cool biochar based on heat exchange.

In an illustrative example, an exemplary hydrocarbon gas direct biochar cooling implementation may be employed wherever a gasification system exists. Other applicable industries for the disclosed steam direct and hydrocarbon gas direct biochar cooling technologies include, for example, producers of biochar interested in augmenting their biochar product for higher value applications; producers of purified gas streams for beneficial use applications or sequestration; wastewater treatment plants and biosolid aggregators; wood and agricultural processors and biomass/biomass waste aggregators; consumers that are looking for specialty carbon materials for advance bioproduct manufacturing; and land remediators, water pollution control system providers, and odor control system providers.

FIG. 6 depicts an exemplary downdraft gasifier implementation in accordance with the present disclosure. Disclosed is a gasifier comprising a plurality of conjoined and vertically positioned tubes. The tubes have an interior wall and exterior wall and a proximal and distal end wherein the proximal end provides an inlet and the distal end provides an outlet. The gasifier has three separate reaction zones: (1) a Pyrolysis Zone; (2) an Oxidation Zone beneath the Pyrolysis Zone; and (3) a Reduction Zone beneath the Oxidation Zone.

A rotating and vertically adjustable grate is located below, but not attached to, the Reduction Zone. Unlike other gasifiers, this is a partially open core gasifier without an airtight seal on the distal end of the gasifier. The Producer Gas exits through the grate and is collected by collection vents on the sides of the collection chutes.

In FIG. 6, arrows depict an exemplary gasification process in the exemplary downdraft gasifier 600. Three types of Oxidant Streams enter the gasifier through three separate, corresponding inlet points: Purge Oxidant Streams, Bed Oxidant Streams and Plano Oxidant Streams. The Purge Oxidant Stream is the Oxidant Stream that is introduced to the feedstock and enters the gasifier with the feedstock through a Pressure Lock. The Purge Oxidant Stream also prevents tarry gases from back-flowing into the Pressure Lock. The Bed Oxidant Stream enters the gasifier through inlets 611 located at the top of the gasifier. The Plano Oxidant Streams enter the gasifier through the Plano Air Inlets 631, 632 located in rings around the perimeter of the Oxidation Zone 630. In the depicted example, an exemplary Control System monitors and adjusts each of these Oxidant Streams to control the total amount of Oxygen in each zone of the gasifier and the rate of Producer Gas being generated. The Control System can adjust the volume and velocity of this Oxidant Stream to adjust for feedstock having differing moisture contents, bulk densities, or even because of changes in the BTU value of a feedstock. The Control System allows for the changes to be made while the gasifier is in operation, so that it does not need to be shut down or be reconfigured. In the depicted implementation, the gasifier includes the Pyrolysis Zone 620, the Oxidation Zone 630, and the Reduction Zone 640 with a grate located underneath the gasifier. Below the gasifier are gas collection vents, and Biochar collection chutes.

The Oxidation Zone 630 is the zone in the gasifier leading up to and away from the Oxidation Band 650 or the general step of the method including formation of the Oxidation Band 650. The Oxidation Zone 630 is where the Oxidation Band 650 forms and represents the hottest step in the gasification process and is where the cellulosic fraction of the feedstock converts from a solid to a gas. The more Oxygen fed to the gasifier the faster the feedstock is gasified in the Oxidation Zone 630. The faster the reaction, the more Biochar is produced and accumulates in the Reduction Zone 640.

During operation, the flow of an Oxidant Stream through Pyrolysis Zone 620 induces a feedstock gradient to form (1) vertically, beginning toward the top of the outside wall of the Pyrolysis Zone 620 and ending down at a lower ring of Plano Air Inlets 631, 632 in the Oxidation Zone 630 and (2) horizontally, beginning in the center of the gasifier and ending at the wall of the gasifier (the "Induced Feedstock Gradient"). This Induced Feedstock Gradient is an increasing and differential density of feedstock becoming denser toward the perimeter of the gasifier wall and above the Oxidation Band 650 (the "Densest Portion") formed by at least four factors acting in concert: (1) the Pressure Wave from the Oxidation Band 650 pressing feedstock against the interior wall of the gasifier; (2) the geometry of the Pyrolysis Zone 620 and the Oxidation Zone 630 (i.e., angles of the walls); (3) the total volume of the Oxidant Stream flowing into the Pyrolysis Zone 620 and the Oxidation Zone 630; and (4) the relative volume of the Oxidant Stream flowing into each of the Pyrolysis Zone 620 and the Oxidation Zone 630. The Densest Portion of the Induced Feedstock Gradient is illustrated at 660. As Biochar leaves the Oxidation Band 650, the diameter of the Oxidation Zone 630 narrows to approximately the same size as the inlet to the Oxidation Zone 630. The Pressure Wave from the Oxidation Band 650 pushes the Biochar against the narrowing wall of the Oxidation Zone. The Densest Portion of this Entrained Biochar Gradient is illustrated at 670. The Pressure Wave slows the movement of the Densest Portion of the Biochar in the Entrained Biochar Gradient 670 relative to Biochar.

Implementing a Control System for variable control of the Bypass 649 and the Oxidant Stream in the gasifier also ensures the consistency and quality of the Producer Gas. The Bypass 649 functions to control Producer Gas flow out of the Reduction Zone 640, the Bypass 649 acting similar to a valve. For example, a short Bypass increases resistance to Producer Gas flow through the grate and causes pressure to build in the gasifier.

There are several different redundant control methods used in the gasifier, and most function as a means by which more precise control can be achieved throughout the process. In one embodiment, an effective control method is to monitor the thermal gradient, or profile, as indicated by the temperatures of each zone. These temperatures are obtained by way of embedded thermocouples inside of the lined wall of the gasifier. This temperature gradient, or profile, is a very good indicator of where each zone is and where it is moving toward within the gasifier. In one embodiment, the Control System uses this information to change the balance of Oxidant Stream at any given zone or to physically change the height of the bed of Biochar in the Reduction Zone 640 by way of the grate rotation and bypass 649 to help maintain and/or sustain each zone above it.

One embodiment improves the consistency of the Producer Gas by lining the entire gasifier with silica carbide, silica oxide, aluminum oxide, refractory alloy, other ceramics or another material that is stable at high temperatures. This lining helps to evenly distribute and conduct heat out from the Oxidation Band 650 and allows the use of thermocouples while protecting them from the reactions occurring inside the gasifier.

The Control System may use all of the different methods and combine said methods into an algorithmic controller. The latter does not only allow for redundancy throughout the Control System but also ensures much greater reliability and efficiency. It furthermore ensures that the Producer Gas is of constant and high quality.

The application and method of gasification described above also provides an effective way of controlling the height of the Reduction Zone 640. In one embodiment of this gasifier, the Oxidation Band 650 can move up into the Pyrolysis Zone 620 or down into the Reduction Zone 640 and still be controlled and/or maintained by way of where the Control System allows the Oxidant Stream to be placed and amount of Biochar being removed. Disruption to the height of the feedstock, or the differential pressure across the gasifier can therefore be controlled by way of the grate rotation without risking the Oxidation Band 650 collapse.

FIG. 7 depicts an exemplary fluidized bed gasifier implementation in accordance with the present disclosure. FIG. 7 depicts the exemplary small and large-scale fluidized bed gasifier 700 designed to gasify biosolids; wherein the large-scale gasifier includes a reactor vessel with a pipe distributor and at least two fuel feed inlets for feeding biosolids into the reactor vessel at a desired fuel feed rate of more than 40 tons per day with an average fuel feed rate of about 100 tons per day during steady-state operation of the gasifier. The fluidized bed in the base of the reactor vessel has a cross-sectional area that is proportional to at least the fuel feed rate such that the superficial velocity of gas is in the range of 0.1 m/s (0.33 ft/s) to 3 m/s (9.84 ft/s). In operation, biosolids are fed into a fluidized bed reactor and oxidant gases are applied to the fluidized bed reactor to produce a superficial velocity of producer gas in the range of 0.1 m/s (0.33 ft/s) to 3 m/s (9.84 ft/s). The biosolids are heated inside the fluidized bed reactor in an oxygen-starved environment having a sub-stoichiometric oxygen level, whereby the biosolids are gasified. In an implementation, the internal diameter of the reactor is configured to ensure that the fluidized bed is able to be fluidized adequately for the desired fuel feed rate and the flow rate of the fluidizing gas mixture at different operating temperature, yet prevent slugging fluidization as media is projected up the freeboard section. Other factors may be used in the design and sizing of the gasifier, including internal diameter of the bed section, internal diameter of a freeboard section, height of the freeboard section, bed depth and the bed section height to reach the targeted fuel feed rate.

In the example depicted by FIG. 7, the exemplary gasifier 700 is a scaled-up implementation of a bubbling type fluidized bed gasifier 700. In an implementation, the bubbling fluidized bed gasifier 700 will include a reactor 799 operably connected to the feeder system (not shown) as an extended part of the standard gasifier system 700. A fluidized media bed 704A such as but not limited to quartz sand is in the base of the reactor vessel called the reactor bed section 704. The fluidized sand is a zone that has a temperature of 1150° F.-1600° F. Located above the reactor bed section 704 is a transition section 704B and above the transition section 704B is the freeboard section 705 of the reactor vessel 799. Fluidizing gas consisting of air, flue gas, pure oxygen or steam, or a combination thereof, is introduced into the fluidized bed reactor 799 to create a velocity range inside the freeboard section 705 of the gasifier 700 that is in the range of 0.1 m/s (0.33 ft/s) to 3 m/s (9.84 ft/s). The biosolids are heated inside the fluidized bed reactor to a temperature range between 900° F. and 1600° F. in an oxygen-starved environment having sub-stoichiometric levels of oxygen, e.g., typically oxygen levels of less than 45% of stoichiometric. In another embodiment, the fluidized sand is a zone that has a temperature of 1150° F.-1600° F.

The reactor fluidized bed section 704 of a fluidized bubbling bed gasifier 700 is filled with a fluidizing media 704A that may be a sand (e.g., quartz or olivine), or any other suitable fluidizing media known in the industry. Feedstock such, as but not limited to sludge, is supplied to the reactor bed section 704 through fuel feed inlets 701 at 40° F.-250° F. In one embodiment the feedstock is supplied to the reactor bed section 704 through fuel feed inlets 701 at 215° F.; with the gas inlet 703 in the bubbling bed receiving an oxidant-based fluidization gas such as but not limited to e.g., gas, flue gas, recycled flue gas, air, enriched air and any combination thereof (hereafter referred to generically as "gas" or "air"). In one embodiment the air is at about 600° F. The type and temperature of the air is determined by the gasification fluidization and temperature control requirements for a particular feedstock. The fluidization gas is fed to the bubbling bed via a gas distributor. An oxygen-monitor 709 may be provided in communication with the fluidization gas inlet 703 to monitor oxygen concentration in connection with controlling oxygen levels in the gasification process. An inclined or over-fire natural gas burner (not visible) located on the side of the reactor vessel 799 receives a natural gas and air mixture via a port 702. In one embodiment, the natural gas air mixture is 77° F. which may be used to start up the gasifier and heat the fluidized bed media 704A. When the minimum ignition temperature for self-sustaining of the gasification reactions is reached (about 900° F.), the natural gas is shut off. View ports 706 and a media fill port 712 are also provided.

In one embodiment, a freeboard section 705 is provided between the fluidized bed section 704 and the producer gas outlet 710 of the gasifier reactor vessel 799. As the biosolids thermally decompose and transform in the fluidized bed media section (or sand zone) into producer gas and then rise through the reactor vessel 799, the fluidizing medium 704A in the fluidized bed section 704 is disentrained from the producer gas in the freeboard section 705 which is also known as and called a particle disengaging zone. A cyclone separator 707 may be provided to separate material exhausted from the fluidized bed reactor 799 resulting in clean producer gas for recovery with ash exiting the bottom of the cyclone separator 707 alternatively for use or disposal.

An ash grate 711 may be fitted below the gasifier vessel for bottom ash removal. The ash grate 711 may be used as a sifting device to remove any large inert, agglomerated or heavy particles so that the fluidizing media and unreacted char can be reintroduced into the gasifier for continued utilization. In one embodiment, a valve such as but not limited to slide valve 713 which is operated by a mechanism to open the slide valve 714 is located beneath the ash grate 711 to collect the ash. In one embodiment, a second valve 713 and operating mechanism 714 (not shown) are also located below the cyclone separator 707 for the same purpose. That is, as a sifting device to remove any large inert, agglomerated or heavy particles so that the fluidizing media and unreacted char can be reintroduced into the gasifier for continued utilization. In one embodiment the ash grate 711 may be a generic solids removal device known to those of ordinary skill in the art. In another embodiment, the ash grate 711 may be replaced by or combined with the use of an overflow nozzle.

The producer gas control 708 monitors oxygen and carbon monoxide levels in the producer gas and controls the process accordingly. In one embodiment a gasifier feed system (not shown) feeds the gasifier reactor 799 through the fluidized fuel inlets 701. In one embodiment, the gasifier unit 700 is of the bubbling fluidized bed type with a custom fluidizing gas delivery system and multiple instrument control. The gasifier reactor 799 provides the ability to continuously operate, discharge ash and recycle flue gas for optimum operation. The gasifier reactor 799 can be designed to provide optimum control of feed rate, temperature, reaction rate and conversion of varying feedstock into producer gas.

A number of thermocouple probes (not shown) are placed in the gasifier reactor 799 to monitor the temperature profile throughout the gasifier. Some of the thermal probes are placed in the fluidized bed section 704 of the gasifier rector 799, while others are placed in the freeboard section 705 of the gasifier. The thermal probes placed in the fluidized bed section 704 are used not only to monitor the bed temperature but are also control points that are coupled to the gasifier air system via port 702 in order to maintain a certain temperature profile in the bed of fluidizing media. There are also a number of additional control instruments and sensors that may be placed in the gasifier system 700 to monitor the pressure differential across the bed section 704 and the operating pressure of the gasifier in the freeboard section 705. These additional instruments are used to monitor the conditions within the gasifier as well to as control other ancillary equipment and processes to maintain the desired operating conditions within the gasifier. Examples of such ancillary equipment and processes include but are not limited to the cyclone, thermal oxidizer and recirculating flue gas system and air delivery systems. These control instruments and sensors are well known in the industry and therefore not illustrated.

An optional ash grate 711 may be fitted below the gasifier vessel for bottom ash removal. The ash grate 711 may be used as a sifting device to remove any agglomerated particles so that the fluidizing media and unreacted char can be reintroduced into the gasifier for continued utilization. In one embodiment, a slide valve 713 operated by a mechanism to open the slide valve 714 is located beneath the ash grate 711 to collect the ash. In one embodiment, a second slide valve 713 and operating mechanism 714 are located below the cyclone separator 707.

As with the small format fluidized bed gasifier, some unreacted carbon is carried into the cyclone separator 707 with particle sizes ranging from 10 to 300 microns. When the solids are removed from the bottom of the cyclone, the ash and unreacted carbon can be separated and much of the unreacted carbon recycled back into the biogasifier, thus increasing the overall fuel conversion to at least 95%. Ash accumulation in the bed of fluidizing media may be alleviated through adjusting the superficial velocity of the gases rising inside the reactor. Alternatively, bed media and ash could be slowly drained out of the gasifier base and screened over an ash grate 711 before being reintroduced back into the biogasifier. This process can be used to remove small, agglomerated particles should they form in the bed of fluidizing media and can also be used to control the ash-to-media ratio within the fluidized bed.

A feedstock such as but not limited to biosolid material can be fed into the gasifier by way of the fuel feed inlets 701 from more than one location on the reactor vessel 799 and wherein said fuel feed inlets 701 may be variably sized such that the desired volumes of feedstock are fed into the gasifier through multiple feed inlets 701 around the reactor vessel 799 to accommodate a continuous feed process to the gasifier. For the present invention and in one embodiment, the number of fuel feed inlets is between 2-4. The minimum number of feed inlets 701 is based, in part, on the extent of extent of back mixing and radial mixing of the char particles in the bed and on the inside diameter of the reactor bed section 704. For bubbling fluidized beds, one feed point could be provided per 20 ft$^2$ of bed cross sectional area. For example, and in one embodiment, if the reaction bed section has an internal diameter of 9 ft, the reactor vessel 799 will have at least 3 feed inlets 701 (located equidistant radially to maintain in-bed mixing. Feed inlets 701 may be considered all on one level, or on more than one level or different levels and different sizes.

Figure 8:
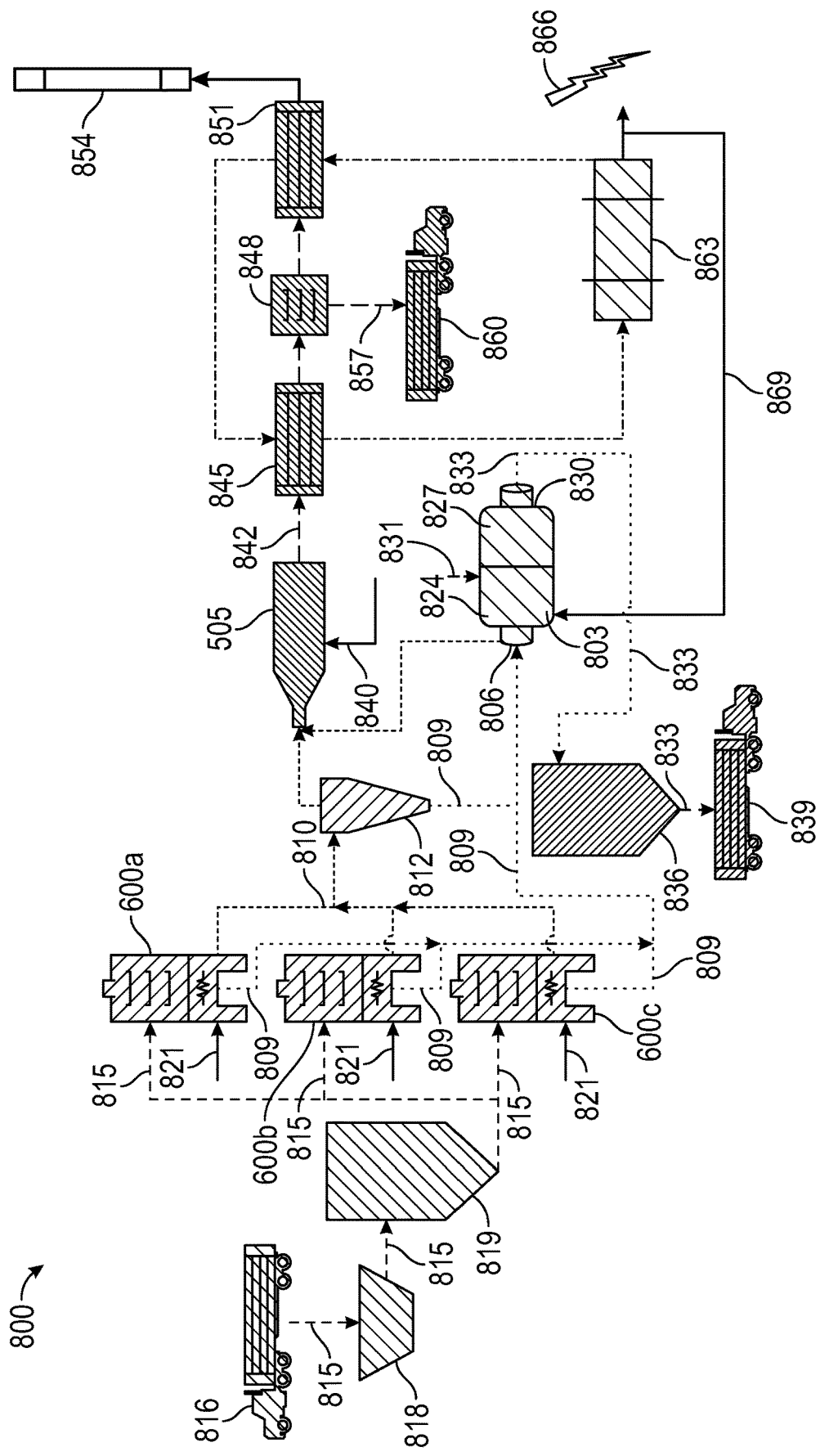
FIG. 8 depicts a schematic view of an exemplary biochar activation and cooling system implementation in accordance with the present disclosure.

FIG. 8 depicts a schematic view of an exemplary biochar activation and cooling system implementation in accordance with the present disclosure. In FIG. 8, the exemplary integrated biochar activation and cooling system 800 is configured to produce a controlled activation level enhanced surface area biochar product based on adjusting biochar temperature, cooling biochar with injected steam, and recovering volatiles driven off through dehydration, using the depicted processing vessel 803. In the depicted implementation, the processing vessel 803 is a calciner. The processing vessel 803 may be rotary calciner. The processing vessel 803 may be a rotary kiln. In the depicted implementation, the processing vessel 803 is configured with the processing vessel inlet 806. The processing vessel inlet 806 is configured to be fluidly coupled with the depicted gasifier system comprising gasifiers 600a,b,c. In the depicted implementation each of the gasifier 600a, the gasifier 600b, and the gasifier 600c is a downdraft gasifier. In the depicted implementation, the gasifier system 600a,b,c supplies the gasifier flow to cyclone 810 to the cyclone 812. In the depicted implementation the processing vessel 803 receives biochar 809 from the depicted gasifier system 600a,b,c, and the cyclone 812. The depicted gasifier system 600a,b,c receives feedstock 815 delivered by the feedstock delivery means 816. In the depicted implementation, the feedstock delivery means 816 is a motor vehicle comprising a truck. The feedstock delivery means 816 may comprise, for example, a conveyor system, pipeline, or other delivery means as would be known to one of ordinary skill. In the depicted example, the feedstock 815 is transferred to the feedstock receiving hopper 818 and ingested by the gasifier system 600a,b,c from the feedstock storage bins 819 with air 821. In the depicted implementation, the processing vessel 803 includes the processing vessel heating section 824 and the processing vessel cooling section 827. In the depicted implementation, the processing vessel 803 is configured to receive biochar 809 using the processing vessel inlet 806, control activation levels of the biochar 809 by moving the biochar through the processing vessel 803, adjust the temperature of the biochar 809 by injecting steam 831 into at least one temperature-controlled chamber of the processing vessel 803, and discharging at the processing vessel outlet 830 an enhanced surface area biochar product 833 with a desired activation level. In the depicted implementation, the discharged activated biochar product 833 is collected in the activated carbon storage/loadout bin 836 for transport by the biochar product transport means 839. In the depicted implementation, the biochar product transport means 839 is a motor vehicle comprising a truck. The biochar product transport means 839 may comprise, for example, a conveyor system, pipeline, or other delivery means as would be known to one of ordinary skill. Volatiles driven off through dehydration in the processing vessel 803 may be recovered using the thermal oxidizer 505 supplied with ambient air 840. In the depicted implementation, the thermal oxidizer 505 supplies process heat 842 to the first heat recovery exchanger 845, emission control device 848, and second heat recovery exchanger 851 to reduce emissions and recover energy before exhaust to the stack 854. In the depicted implementation, spent sorbent 857 from the emission control device 848 is collected for transport by the spent sorbent transport means 860. In the depicted implementation the spent sorbent transport means 860 is a motor vehicle comprising a truck. The spent sorbent transport means 860 may comprise, for example, a conveyor system, pipeline, or other delivery means as would be known to one of ordinary skill. In the depicted implementation, the first heat recovery exchanger 845 and second heat recovery exchanger 851 are operably coupled to exchange heat with the organic Rankine cycle 863 to generate the electric energy to grid 866 also supplied to the processing vessel 803 as recovered process electric energy 869. In an illustrative example, the processing vessel 803 may use the recovered process electric energy 869 to provide electrical power to the processing vessel heating section 824, to power a control system configured to govern operation of the implementation to perform steps of an exemplary process, or to power a rotary inner cylinder configured to move biochar 809 through the processing vessel.

Figure 9:
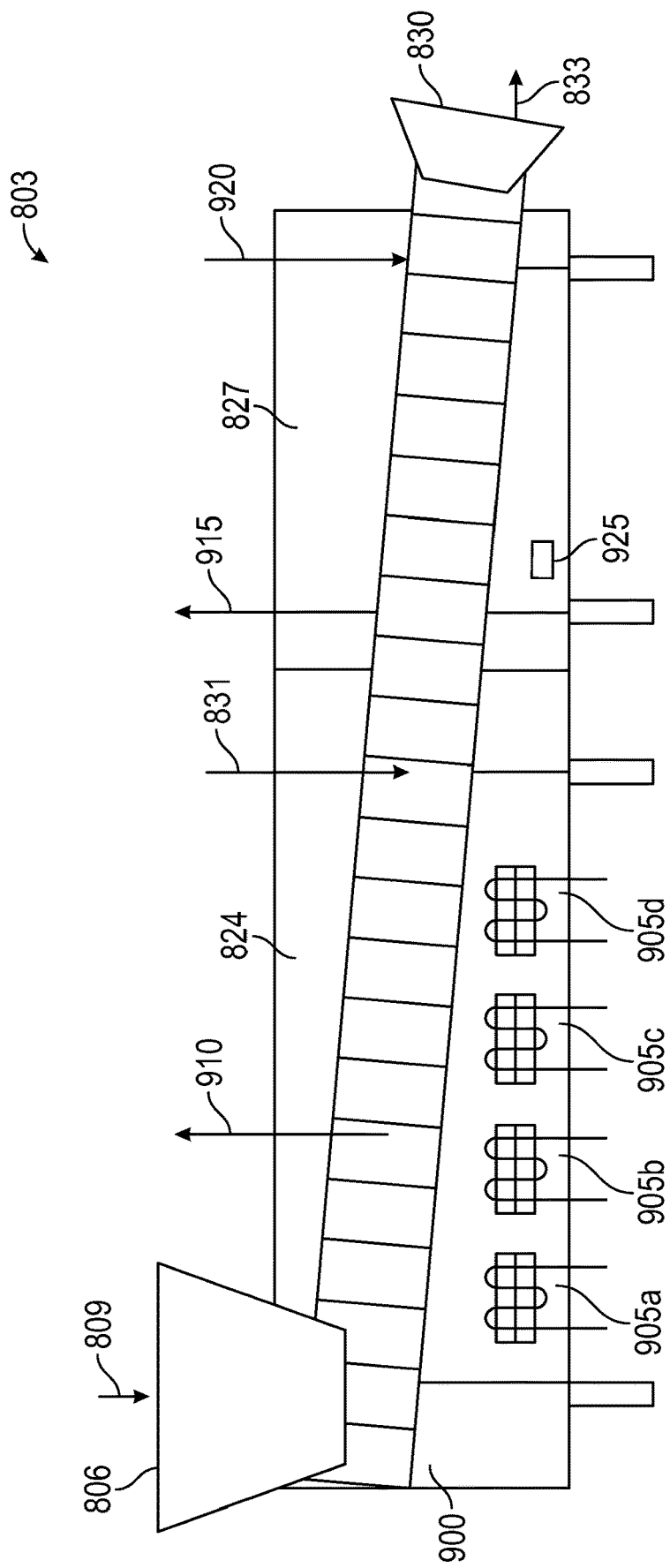
FIG. 9 depicts a schematic view of an exemplary biochar cooling and activation processing vessel implementation in accordance with the present disclosure.

FIG. 9 depicts a schematic view of an exemplary biochar cooling and activation processing vessel implementation in accordance with the present disclosure. In FIG. 9, the exemplary processing vessel 803 includes the processing vessel heating section 824 and the processing vessel cooling section 827. In the depicted implementation, the processing vessel heating section 824 is configured in fluid coupling with the processing vessel inlet 806 to receive biochar 809. The biochar 809 may be received from a gasifier. The received biochar may, for example, have a temperature in the range 750° F.-850° F. In the depicted implementation, the processing vessel cooling section 827 is configured in fluid coupling with the processing vessel outlet 830 to discharge the activated biochar product 833. The depicted processing vessel 803 is a rotary calciner. In the depicted implementation, the processing vessel 803 is configured with the rotating processing vessel cylinder 900 designed to move the biochar 809 through the processing vessel 803. The rotating processing vessel cylinder 900 moves the biochar 809 through the multiple independently temperature-controllable processing vessel sections or chambers, comprising the processing vessel heating section 824 and the processing vessel cooling section 827. In the depicted implementation, the processing vessel heating means 905a,b,c,d comprise electric heating elements configured to heat the processing vessel heating section 824. In the depicted implementation, counter-flow saturated steam 831 injected at a target temperature of 250° F. flows opposite the biochar 809 flow direction to sweep the off gas to thermal oxidizer 910 and sweep gas 915 from the processing vessel cylinder 900. In the depicted implementation the processing vessel cooling section 827 may be cooled using the cooling water/air 920. The depicted processing vessel 803 includes the control system 925 configured to govern the fluid coupling between the processing vessel heating section 824 and the processing vessel cooling section 827. The control system 925 is configured to govern the temperature of the processing vessel heating section 824 and the processing vessel cooling section 827. The control system 925 may use electricity or hot air/exhaust gas for heating the processing vessel heating section 824 to a target temperature range of 800° F.-1100° F. determined by the control system 925. The control system 925 is configured to govern the retention time of biochar 809 in the processing vessel heating section 824 and the processing vessel cooling section 827, based on controlling the fluid coupling between the processing vessel heating section 824 and the processing vessel cooling section 827. In the depicted implementation, the target residence time of biochar 809 in the processing vessel heating section 824 may be in the range of 20-30 minutes determined by the control system 925. The control system 925 may indirectly heat or cool biochar 809 based on adjusting the temperature and retention time of biochar 809 in the heating section 824 and/or the cooling section 827. The activated biochar product 833 may have a target temperature range of 100° F.-200° F. determined by the control system 925.

Figure 10:
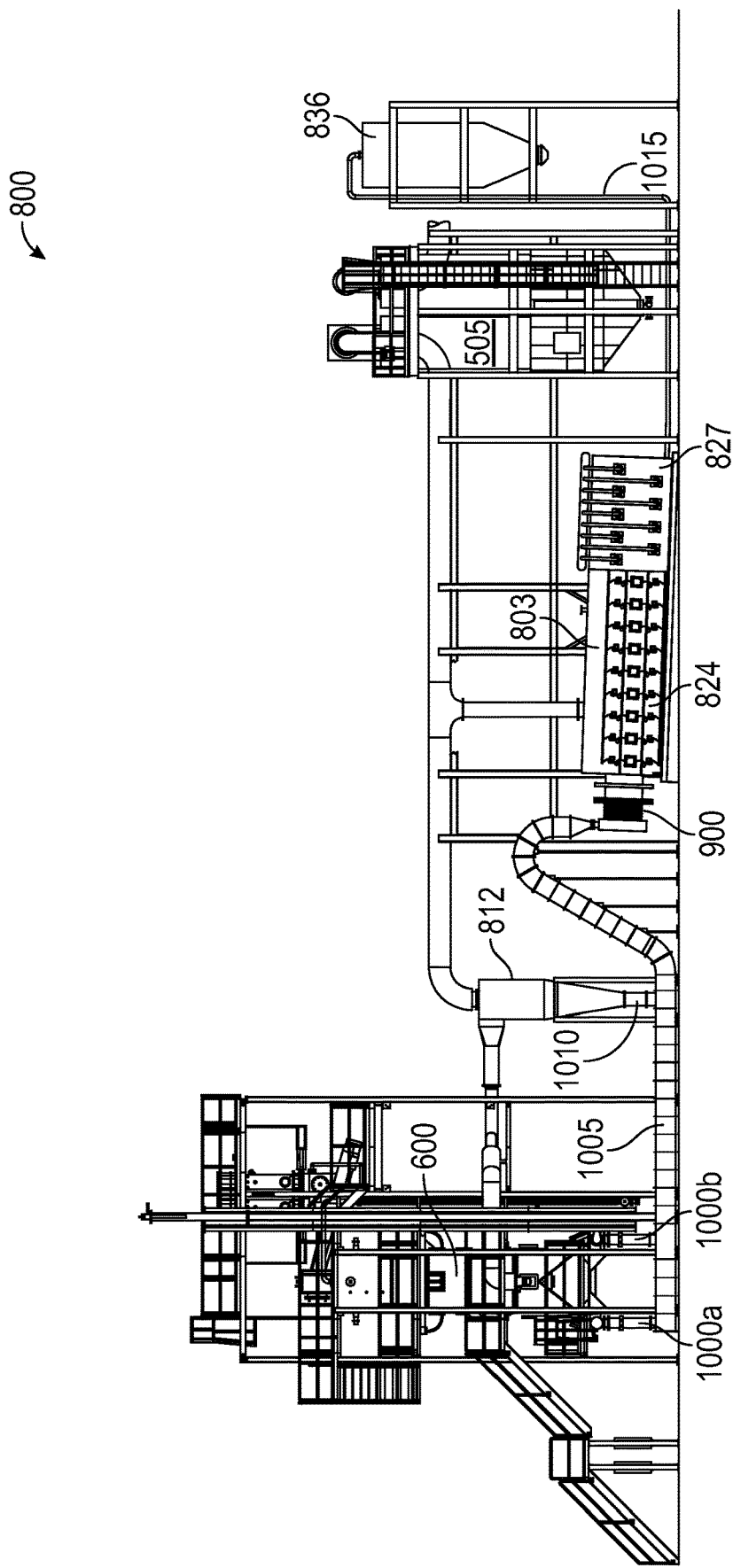
FIG. 10 depicts a plan view of an exemplary biochar activation and cooling system implementation in accordance with the present disclosure.

FIG. 10 depicts a plan view of an exemplary biochar activation and cooling system implementation in accordance with the present disclosure. In FIG. 10, the exemplary integrated biochar activation and cooling system 800 includes the downdraft gasifier 600 operably coupled with the cyclone 812, the processing vessel 803, and the thermal oxidizer 505 to produce an activated biochar product for collection in the activated carbon storage/loadout bin 836. The depicted processing vessel 803 receives biochar from downdraft gasifier 600 biochar outlets 1000a,b via the biochar conveyor 1005 and the gasifier cyclone biochar outlet 1010. In the depicted implementation, the processing vessel 803 is configured with the rotating processing vessel cylinder 900 designed to move biochar through the processing vessel 803 heating section 824 and cooling section 827 to the tube chain conveyor 1015 for collection in the activated carbon storage/loadout bin 836.

Figure 11:
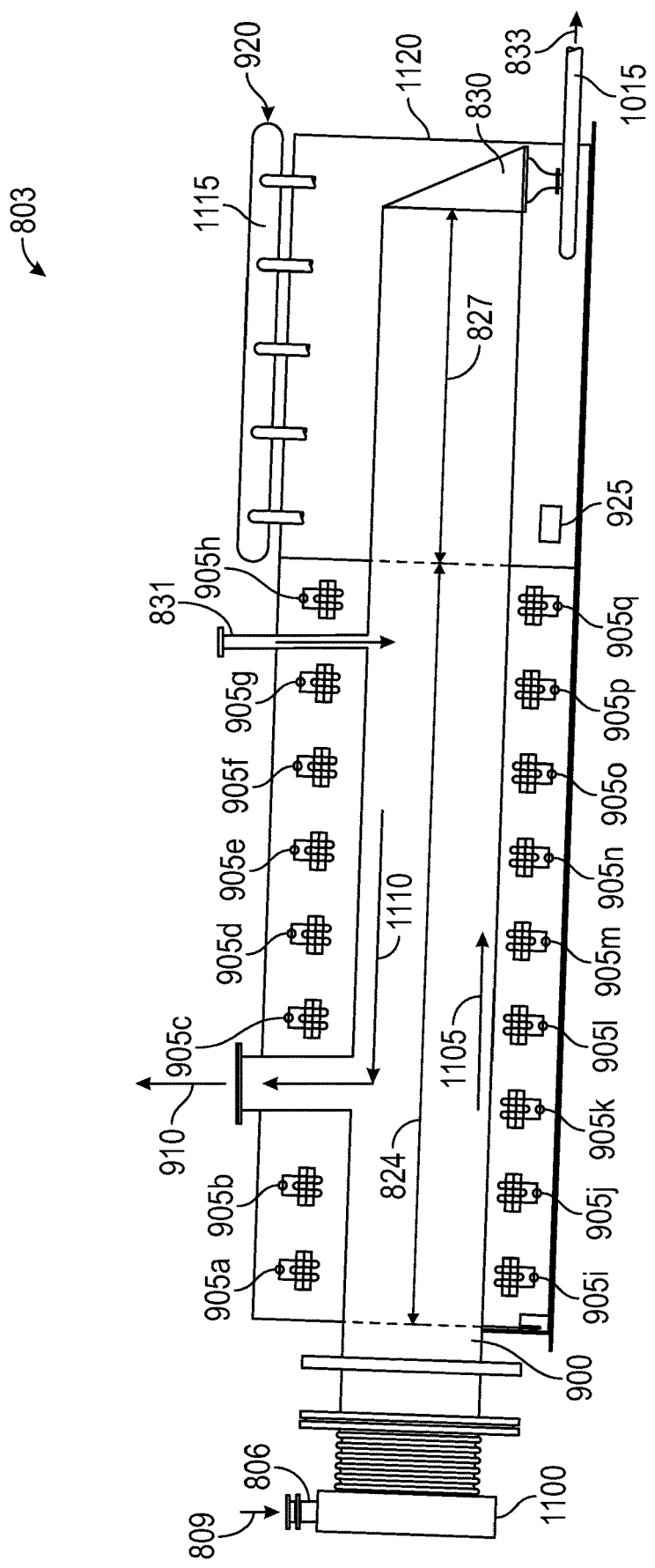
FIG. 11 depicts a schematic view of an exemplary biochar cooling and activation processing vessel implementation in accordance with the present disclosure.

FIG. 11 depicts a schematic view of an exemplary biochar cooling and activation processing vessel implementation in accordance with the present disclosure. In FIG. 11, the exemplary processing vessel 803 includes the features and ranges described with reference to FIGS. 8, 9, and 10. FIG. 11 shows the processing vessel inlet 806 disposed at the processing vessel head 1100 proximal to the heating section 824. In the depicted implementation the direction of solids flow 1105 from the processing vessel head 1100 is opposite the direction of the counter-flow gas 1110 from the processing vessel tail 1120. In the depicted implementation the cooling manifold 1115 supplies water or air for cooling to the cooling section 827.

Although various features have been described with reference to the Figures, other features are possible. For example, catalytic methane decomposition is a promising pathway for the energy transition to a decarbonized economy. Catalysts and reactor designs are being optimized to increase reaction stability. In addition, carbon is a valuable by-product with the potential creation of new markets, and catalyst regeneration may be employed and optimized for long-term stability. In combination, such exemplary lines of research may reduce $CO_2$ emissions based on gradually replacing fossil fuels by a hydrogen-based economy.

A direct biochar cooling system implementation in accordance with the present disclosure may produce biochar having enhanced carbon content with increased surface area, and a hydrogen stream byproduct. In the case of hydrocarbon direct biochar cooling, the resultant biochar may have high grade carbon growth from the decomposition of $CH_4$ in the gas, which has a higher price point than standard biochar as a high-grade carbon manufacturing input.

An implementation in accordance with the present disclosure, of steam direct biochar cooling or hydrocarbon gas direct biochar cooling may cost less to install and operate, and produce more valuable byproducts, than an indirect biochar cooling implementation. In the case of steam direct biochar cooling, the resultant biochar may have a greater surface area, which has a higher price point than standard biochar, and may be a competitive alternative to activated carbon.

In illustrative examples, low-cost biochar produced from biomass products (wood and wood residues, agricultural and agricultural residues, sludges, biosolids, and other suitable organic materials) is growing in importance and application across a variety of industries. Various *Aries* downdraft and fluidized bed gasifier system implementations may produce a hot carbonaceous solid residue that, when cooled, is commonly referred to as biochar (also referred to as "bio fly ash" when recovered from a cyclone).

In illustrative examples, biochar may be favorable as a terrestrial carbon sink, fertilizer, soil supplement, composting supplement, solids, water or gas filtration media for neutralization, odor control, purification and/or refinement, bioproduct manufacturing input, renewable building material manufacturing input, and solid catalyst input.

In an illustrative example, some implementations of *Aries*' prior art indirect biochar cooling designs may process and cool hot carbonaceous solid gasification residue indirectly utilizing a water fed cooling screw. In contrast, an *Aries* direct biochar cooling design in accordance with the present disclosure may provide an alternative approach to cooling hot carbonaceous solid gasification residues utilizing direct application of gas comprising steam or hydrocarbon gas to produce a biochar different in composition and physical format to biochar produced by indirect cooling. This resultant biochar produced based on cooling utilizing direct application of gas comprising steam or hydrocarbon gas may be more suitable for certain product applications.

Various examples in accordance with the teaching of the present disclosure relate to a cost-effective means to cool hot biochar produced through gasification using direct application of cool gases made up of $H_2O$ or $CH_4$. In one aspect of the present disclosure, direct cooling of hot biochar with steam as the hot biochar exits the gasifier or cyclone creates an economical way to cool biochar while enhancing the surface area of the biochar resulting in a byproduct that is comparable to activated carbon. In another aspect of the present disclosure, direct cooling of hot biochar with hydrocarbon gas as the hot biochar exits the gasifier or cyclone creates an economical way to cool biochar while enhancing the high-quality carbon content of our biochar with nano tube type carbon formation on the biochar while producing a gas stream that can be filtered for high value chemical (specifically hydrogen) recovery.

In illustrative examples, a biochar activation and cooling implementation in accordance with the teaching of the present disclosure may integrate a processing vessel with a gasifier to activate biochar produced by the gasifier. In some implementations the processing vessel may be a rotary type calciner or kiln attached to a downdraft gasifier system to activate biochar produced by the gasifier system. The gasifier system may comprise a plurality of gasifiers. An exemplary biochar activation and cooling implementation may receive hot biochar, discharged and recovered from a cyclone dip leg into the front end of an indirect fired type of rotary calciner. In an illustrative example of using an indirect calciner, the indirect calciner rotating drum is enclosed in a heat shroud or furnace to keep the material and heating medium separate. This heat shroud externally heats the rotating drum, and the material is subsequently heated through contact with the drum shell interior. In an illustrative example, an indirect calciner rotating drum may be a cylinder that spins inside a heating/cooling chamber to perform indirect thermochemical processing within a controlled atmosphere. Depending upon the temperature of biochar as the biochar enters the calciner cylinder, the biochar may be indirectly heated in the initial sections (high temperature sections) of the rotary calciner's heating/cooling chamber to achieve the optimal thermochemical processing temperature. The biochar will flow through the rotary calciner, and the biochar will be cooled to the desired discharge temperature through steam injection as the biochar progresses through the cylinder. The biochar will exit the tail end of the cylinder at a predetermined design control temperature suitable for handling, storage and load out. At the end of the high temperature sections of the calciner, low temperature saturated steam will be injected counterflow into the cylinder cooling the biochar and sweeping any released volatile gases from the biochar. The gas effluent will exit the cylinder via a fan driven vacuum port at the front end of the rotary calciner and will be directed to a thermal oxidizer. The initial sections of a rotary calciner (high temperature sections) may be heated using electricity, natural gas, waste heat recovered via hot thermal liquids, or hot gases. The cooling chamber sections (low temperature sections) of the rotary calciner may be cooled using air, water, waste cooling via cool thermal liquids or cool gases.

An exemplary biochar activation and cooling implementation in accordance with the teaching of the present disclosure may use a processing vessel that may be a calciner or kiln integrated with a biochar source to activate and cool biochar received from the biochar source. The biochar source may be a gasifier. The gasifier may be a downdraft gasifier or a downdraft gasifier system comprising a plurality of gasifiers. In an illustrative scenario exemplary of various biochar activation and cooling implementations' design and usage, a system in accordance with the present disclosure may cool biochar in the controlled environment of a processing vessel such as a calciner or kiln so that volatiles and moisture present in the biochar, to the extent they are released from the biochar as the biochar progresses through the calciner, are recovered and oxidized reducing emissions and generating waste heat for use; alternatively the recovered gases may be processed for sale.

An implementation in accordance with the present disclosure may cool biochar in part using saturated steam which facilitates the potentiality for a water gas shift reaction generating mixed gases enriched with $H_2$, CO and $CO_2$ that are recovered and oxidized rather than being released to the atmosphere, reducing emissions, and generating waste heat for use; alternatively, the recovered gases may be processed for sale. Cooling the biochar at least in part using saturated steam facilitates the formation of additional macro and micro pores in the biochar as moisture and volatiles are driven off through dehydration, thermochemical conversion, and or/decomposition reactions, advantageously increasing the biochar's surface area.

In illustrative examples, a biochar activation and cooling implementation in accordance with the teaching of the present disclosure may augment an external steam injected counter current cooling chamber to cool biochar with utilization of a suitable processing vessel such as a calciner configured to provide indirect biochar heating and cooling capability. Such indirect biochar heating and cooling capability provides capability to boost the temperature of the biochar using indirect heat within the high temperature zone of the processing vessel to an optimal thermochemical processing temperature while maintaining the controlled environmental integrity of the biochar in the inner cylinder. Boosting the temperature of the biochar may or may not be required depending upon the temperature of the biochar as the biochar enters the processing vessel from the biochar source. Being able to control the thermochemical processing temperature of the biochar increases the opportunity to maximize certain biochar-related chemical properties within the processing vessel, such as, for example, dehydration, calcination, and/or decomposition. In an illustrative example, various implementations may advantageously increase the surface area of the resultant biochar by optimizing these chemical reactions, rendering the resultant biochar a more valuable input material for certain biobased product applications such as water purification filtration media, gas filtration media, and environmental remediation media. Using a biochar activation and cooling implementation in accordance with the teaching of the present disclosure, biochar may be cooled while at the same time directing the ancillary thermochemical reactions so as to achieve desired biochar product property outcomes. Various biochar activation and cooling implementations in accordance with the teaching of the present disclosure may control desired producer gas and biochar product outcomes determined as a function of the control system adjusting temperatures in an inner cylinder and multiple section temperature control exterior chambers, in a system configured to permit controlling temperatures in various parts of the processing vessel to adjust the producer gas and biochar products. Some biochar activation and cooling implementations in accordance with the teaching of the present disclosure may produce a final product comprising graphene. Some biochar activation and cooling implementations in accordance with the teaching of the present disclosure may produce a final product comprising activated carbon.

An exemplary biochar activation and cooling implementation in accordance with the teaching of the present disclosure may comprise a downdraft gasifier, a cyclone, piping, an indirect fired rotary calciner with an inner cylinder and multiple section temperature control external chambers, counterflow saturated steam injection, a vacuum driven producer gas sweep system from the head of the calciner, and associated control systems configured to perform the steps of the integrated process using the implementation.

A biochar activation and cooling implementation in accordance with the teaching of the present disclosure may advantageously provide the ability to control the temperature of the biochar and the rate at which the biochar cools. Various exemplary designs contemplate integrating a rotary calciner with countercurrent steam injection as the mechanism for cooling the resultant hot biochar from a downdraft gasification process.

In an illustrative example, an exemplary biochar activation and cooling implementation may be configured to use steam injection in the form of, for example, a lance, steam nozzles, or steam injectors. The calciner heating and cooling systems can take many forms. An optimal steam input system may be evaluated and selected using experimentation and testing techniques accessible to one of ordinary skill in the art, and a desired level of control and/or availability and price of the different utility inputs will likely dictate which approach is optimal in a particular implementation.

A biochar activation and cooling implementation in accordance with the teaching of the present disclosure may replace the inner cylinder cooling agent steam with, for example, carbon dioxide, methane, nitrogen, natural gas or other hydrocarbon gases. Various gases or mixtures of gases may result in different thermochemical reactions within the processing vessel or calciner, and such may be desired in tuning the producer gas product and biochar product. In an illustrative example, certain compounds could be added to the organic matter input pre-gasification or to the biochar pre-calcination or to the steam input to facilitate product quality adjustments or additional thermochemical processes within the processing vessel or calciner. Some implementations may include a biochar sizing step such as grinding or milling pre-calcining if particular particle size distributions and/or product uniformity inside the processing vessel or calciner needs to be ensured.

In an illustrative example, a biochar activation and cooling implementation in accordance with the teaching of the present disclosure may include a calciner or processing vessel of certain inner cylinder diameter to receive the outflows from the respective gasifiers. This inner cylinder diameter is a function of the output of the gasifier and the desired throughput of the calciner. The length of the calciner or processing vessel inner cylinder must be such that it can allow for the optimal cooling and thermochemical processing of the biochar; too short, and the inner cylinder may not function as desired. Testing of processing vessels or calciners with biochar produced in gasifiers may be employed by one of ordinary skill to determine the appropriate sizing of system components to meet the desired process control outcomes.

In an illustrative example, rotary calciners are high temperature machines that process materials into a desired form by changing the state or composition of a material or removing moisture. Indirect rotary calciners are heated from the outside of an enclosed chamber and gives them the ability to process materials that are fine or dusty, susceptible to contamination or combustion, sensitive to oxidation, or thermally sensitive.

In the Summary above and in this Detailed Description, and the Claims below, and in the accompanying drawings, reference is made to particular features of various implementations. It is to be understood that the disclosure of particular features of various implementations in this specification is to be interpreted to include all possible combinations of such particular features. For example, where a particular feature is disclosed in the context of a particular aspect or implementation, or a particular claim, that feature can also be used—to the extent possible—in combination with and/or in the context of other aspects and implementations, and in an implementation generally, whether or not such embodiments are described with and whether or not such features are presented as being a part of a described embodiment. Thus, the breadth and scope of the present disclosure should not be limited by any of the above-described exemplary implementations.

While multiple implementations are disclosed, still other implementations will become apparent to those skilled in the art from this detailed description. Disclosed implementations may be capable of myriad modifications in various obvious aspects, all without departing from the spirit and scope of the disclosed implementations. Accordingly, the drawings and descriptions are to be regarded as illustrative in nature and not restrictive.

It should be noted that the features illustrated in the drawings are not necessarily drawn to scale, and features of one implementation may be employed with other implementations as the skilled artisan would recognize, even if not explicitly stated herein. Descriptions of well-known components and processing techniques may be omitted so as to not unnecessarily obscure the implementation features.

In the present disclosure, various features may be described as being optional, for example, through the use of the verb "may;" or, through the use of any of the phrases: "in some implementations," "in some designs," "in various implementations," "in various designs," "in an illustrative example," or, "for example." For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be implemented in seven different ways, namely with just one of the three possible features, with any two of the three possible features or with all three of the three possible features.

In various implementations, elements described herein as coupled or connected may have an effectual relationship realizable by a direct connection or indirectly with one or more other intervening elements.

In the present disclosure, the term "any" may be understood as designating any number of the respective elements, that is, as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various implementations have been disclosed and described in detail herein, it will be apparent to those skilled in the art that various changes may be made to the disclosed configuration, operation, and form without departing from the spirit and scope thereof. In particular, it is noted that the respective implementation features, even those disclosed solely in combination with other implementation features, may be combined in any configuration excepting those readily apparent to the person skilled in the art as nonsensical. Likewise, use of the singular and plural is solely for the sake of illustration and is not to be interpreted as limiting.

The Abstract is provided to comply with 37 C. F. R. § 1.72(b), to allow the reader to quickly ascertain the nature of the technical disclosure and is submitted with the understanding that it will not be used to interpret or limit the scope or meaning of the claims.

In the present disclosure, all descriptions where "comprising" is used may have as alternatives "consisting essentially of" or "consisting of" In the present disclosure, any method or apparatus implementation may be devoid of one or more process steps or components. In the present disclosure, implementations employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The term "comprises" and grammatical equivalents thereof are used herein to mean that other components, ingredients, steps, among others, are optionally present. For example, an implementation "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Many suitable methods and corresponding materials to make each of the individual parts of implementation apparatus are known in the art. One or more implementation part may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described hereinabove may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f). Elements recited in means-plus-function format are intended to be construed in accordance with 35 U.S.C. § 112 (f).

Recitation in a claim of the term "first" with respect to a feature or element does not necessarily imply the existence of a second or additional such feature or element.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The terms "abutting" or "in mechanical union" refer to items that are in direct physical contact with each other, although the items may not necessarily be attached together.

The word "exemplary" is used herein to mean "serving as an example, instance, or illustration." Any implementation described herein as "exemplary" is not necessarily to be construed as preferred over other implementations. While various aspects of the disclosure are presented with reference to drawings, the drawings are not necessarily drawn to scale unless specifically indicated.

Reference throughout this specification to "an implementation" or "the implementation" means that a particular feature, structure, or characteristic described in connection with that implementation is included in at least one implementation. Thus, the quoted phrases, or variations thereof, as recited throughout this specification are not necessarily all referring to the same implementation.

Similarly, it should be appreciated that in the above description, various features are sometimes grouped together in a single implementation, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects may lie in a combination of fewer than all features of any single foregoing disclosed implementation. Thus, the claims following this Detailed Description are hereby expressly incorporated into this Detailed Description, with each claim standing on its own as a separate implementation. This disclosure is intended to be interpreted as including all permutations of the independent claims with their dependent claims.

A system or method implementation in accordance with the present disclosure may be accomplished through the use of one or more computing devices. As descried, for example, at least with reference to FIGS. 3, 4, 5, 8, 9, 10, and 11 one of ordinary skill in the art would appreciate that an exemplary control system or algorithmic controller appropriate for use with an implementation in accordance with the present application may generally include one or more of a Central processing Unit (CPU), Random Access Memory (RAM), a storage medium (e.g., hard disk drive, solid state drive, flash memory, cloud storage), an operating system (OS), one or more application software, a display element, one or more communications means, or one or more input/output devices/means. Examples of computing devices usable with implementations of the present disclosure include, but are not limited to, proprietary computing devices, personal computers, mobile computing devices, tablet PCs, mini-PCs, servers, or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and implementation of the present disclosure are contemplated for use with any computing device.

In various implementations, communications means, data store(s), processor(s), or memory may interact with other components on the computing device, in order to effect the provisioning and display of various functionalities associated with the system and method detailed herein. One of ordinary skill in the art would appreciate that there are numerous configurations that could be utilized with implementations of the present disclosure, and implementations of the present disclosure are contemplated for use with any appropriate configuration.

According to an implementation of the present disclosure, the communications means of the system may be, for instance, any means for communicating data over one or more networks or to one or more peripheral devices attached to the system. Appropriate communications means may include, but are not limited to, circuitry and control systems for providing wireless connections, wired connections, cellular connections, data port connections, Bluetooth® connections, or any combination thereof. One of ordinary skill in the art would appreciate that there are numerous communications means that may be utilized with implementations of the present disclosure, and implementations of the present disclosure are contemplated for use with any communications means.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an implementation may include an alternate order of the steps adapted to a particular application of a technique disclosed herein. All such variations and modifications are intended to fall within the scope of this disclosure. The depiction and description of steps in any particular order is not intended to exclude implementations having the steps in a different order, unless required by a particular application, explicitly stated, or otherwise clear from the context.

Traditionally, a computer program consists of a sequence of computational instructions or program instructions. It will be appreciated that a programmable apparatus (that is, computing device) can receive such a computer program and, by processing the computational instructions thereof, produce a further technical effect.

A programmable apparatus may include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable, and replaceable, or fixed. It will also be understood that a computer can include a Basic Input/Output System (BIOS), firmware, an operating system, a database, or the like that can include, interface with, or support the software and hardware described herein.

Implementations of the system as described herein are not limited to applications involving conventional computer programs or programmable apparatuses that run them. It is contemplated, for example, that implementations of the disclosure as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code encoded therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code encoded by a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

Unless explicitly stated or otherwise clear from the context, the verbs "execute" and "process" are used interchangeably to indicate execute, process, interpret, compile, assemble, link, load, any and all combinations of the foregoing, or the like. Therefore, implementations that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, implementations of the disclosure are not described with reference to any particular programming language. It is appreciated that a variety of programming languages may be used to implement the present teachings as described herein, and any references to specific languages are provided for disclosure of enablement and best mode of implementations of the disclosure. Implementations of the disclosure are well suited to a wide variety of computer network systems over numerous topologies. Within this field, the configuration and management of large networks include storage devices and computers that are communicatively coupled to dissimilar computers and storage devices over a network, such as the Internet.

A number of implementations have been described. Nevertheless, it will be understood that various modifications may be made. For example, the steps of the disclosed techniques may be performed in a different sequence, components of the disclosed systems may be combined in a different manner, or the components may be supplemented with other components. Such modifications are to be considered as included in the following claims unless the claims by their language expressly state otherwise. Variations described for exemplary implementations of the present disclosure may be realized in any combination desirable for each application. Accordingly, other implementations are contemplated, within the scope of the following claims.

What is claimed is:

1. An apparatus comprising:
   a processing vessel (803) configured to receive biochar (809);
   a thermal oxidizer (505), operably coupled with the processing vessel (803);
   a plurality of independently temperature-controlled chambers configured in the processing vessel (803), wherein the plurality of independently temperature-controlled chambers comprise a processing vessel heating section (824) and a processing vessel cooling section (827);
   a counter-flow steam (831) injection system operably coupled with the processing vessel (803), wherein the counter-flow steam (831) injection system is configured to inject steam (831) into at least one temperature-controlled chamber of the processing vessel (803); and
   a control system (925) operably coupled with the processing vessel (803) and the counter-flow steam (831) injection system, wherein the control system (925) is configured to:
   determine and adjust temperature in at least one temperature-controlled chamber of the processing vessel (803);
   adjust temperature of biochar (809) in the processing vessel (803) based on governing retention time of biochar (809) in the at least one temperature-controlled chamber of the processing vessel (803);
   control activation levels of the biochar (809) by moving the biochar (809) through the processing vessel (803) and adjusting biochar (809) temperature using the counter-flow steam (831) injection system;
   recover volatiles driven off through dehydration using the thermal oxidizer (505);
   cool the biochar (809) to a desired discharge temperature using the counter-flow steam (831) injection system; and
   discharge an activated biochar product (833).

2. The apparatus of claim 1, wherein receive biochar (809) further comprises receive biochar (809) from a downdraft gasifier (600).

3. The apparatus of claim 1, wherein the processing vessel (803) further comprises a calciner, a rotary calciner, or a kiln.

4. The apparatus of claim 1, wherein the apparatus further comprises the control system (925) is further configured to sweep volatile gases to a thermal oxidizer (505) using a vacuum system and counter-flow saturated steam (831).

5. The apparatus of claim 1, wherein the processing vessel (803) further comprises a processing vessel inlet (806) disposed at a processing vessel head (1100) wherein the processing vessel inlet (806) is configured to be fluidly coupled with the processing vessel heating section (824), and a processing vessel outlet (830) disposed at a processing vessel tail (1120) wherein the processing vessel outlet (830) is configured to be fluidly coupled with the processing vessel cooling section (827).

6. The apparatus of claim 1, wherein receive biochar (809) further comprises receive biochar (809) into the processing vessel heating section (824).

7. The apparatus of claim 1, wherein discharge the activated biochar product (833) further comprises discharge the activated biochar product (833) from the processing vessel cooling section (827).

8. The apparatus of claim 1, wherein the apparatus further comprises the control system (925) is further configured to govern retention time of biochar (809) in the processing vessel (803) based on controlling fluid coupling of the processing vessel heating section (824) with the processing vessel cooling section (827).

9. The apparatus of claim 1, wherein adjust the temperature of the biochar (809) in the processing vessel (803) further comprises using the control system (925) to release biochar (809) from the processing vessel heating section (824) into the processing vessel cooling section (827) in response to the control system (925) determining the temperature in the processing vessel heating section (824) is at least a predetermined minimum temperature.

10. The apparatus of claim 1, wherein adjust the temperature of the at least one temperature-controlled chamber of the processing vessel (803) further comprises using the control system (925) to retain biochar (809) in the at least one temperature-controlled chamber of the processing vessel (803) until the control system (925) determines the temperature of the at least one temperature-controlled chamber of the processing vessel (803) satisfied at least a predetermined minimum temperature for at least a predetermined minimum period of time.

11. The apparatus of claim 1, wherein the apparatus further comprises the control system (925) is further configured to adjust the temperature of biochar (809) using the processing vessel heating section (824) to heat the biochar (809) to a predetermined target temperature in response to the control system (925) determining the biochar (809) temperature is less than a predetermined minimum.

12. The apparatus of claim 1, wherein the apparatus further comprises the control system (925) is further configured to adjust the temperature of biochar (809) using the processing vessel cooling section (827) to cool the biochar (809).

13. The apparatus of claim 1, wherein the processing vessel (803) is configured with three distinct temperature-controlled sections comprising a heating section (824), a steam injection/activation chamber, and a cooling chamber (827).

14. The apparatus of claim 1, wherein steam (831) further comprises saturated steam.

\* \* \* \* \*